United States Patent
Kern

(10) Patent No.: US 10,289,077 B2
(45) Date of Patent: *May 14, 2019

(54) RATE-BASED MULTIVARIABLE CONTROL WITH STABILITY ASSURANCE

(71) Applicant: Allan G Kern, Red Lodge, MT (US)

(72) Inventor: Allan G Kern, Red Lodge, MT (US)

(*) Notice: Subject to any disclaimer, the term of this patent is extended or adjusted under 35 U.S.C. 154(b) by 48 days.

This patent is subject to a terminal disclaimer.

(21) Appl. No.: 15/390,125

(22) Filed: Dec. 23, 2016

(65) Prior Publication Data

US 2017/0108836 A1     Apr. 20, 2017

Related U.S. Application Data

(63) Continuation of application No. 14/056,724, filed on Oct. 17, 2013, now Pat. No. 9,563,184.

(51) Int. Cl.
*G05B 17/02* (2006.01)
*G05B 13/04* (2006.01)

(52) U.S. Cl.
CPC ............ *G05B 13/04* (2013.01); *G05B 17/02* (2013.01)

(58) Field of Classification Search
None
See application file for complete search history.

*Primary Examiner* — Thomas C Lee
*Assistant Examiner* — Gary Collins
(74) *Attorney, Agent, or Firm* — Bradley A. Misley

(57) ABSTRACT

Method, system and computer executable instructions for controlling a process.

21 Claims, 10 Drawing Sheets

Simplified example model matrix having three direct control variables (DCVs) and seven indirect control variables (ICVs).

Typical distributed control system (DCS) architecture. A DCS is the best and most obvious method to implement the present inventrion.

Process gain = 1.0
Process response time = 20 minutes
Move size = 1.0
Rate-Time = 20 minutes With a rate-time equal to the "ideal" rate-time, the ICV will settle on its target value, without additional DCV moves.

With a process gain twice the original value, the ICV still settles on its target value.

With a move size twice the original value, the ICV still settles on its target value.

With a rate-time half the original value, there is modest overshoot, ultimately requiring corrective moves in the reverse direction.

With a rate-time twice the original value, there is undershoot, ultimately requiring additional moves in the same direction.

Process gain = 1.0
Process response time = 20 minutes
(not including dead-time)
Move size = 10.0
Rate-time = 40 minutes
Process dead-time = 20 minutes
Period = 40 minutes For processes with significant dead-time, a longer move period and a larger move size are used, to allow the effects of previous moves to become evident.

RATE-BASED MULTIVARIABLE CONTROL WITH STABILITY ASSURANCE

CROSS-REFERENCE TO RELATED APPLICATIONS

The present filing is a continuation to U.S. patent application Ser. No. 14/056,724 filed on Oct. 17, 2013.

FIELD

The present invention is generally related to the process industries, which include mineral and oil refining, chemical and petrochemical production, fossil and nuclear power generation, parts of the food and pharmaceutical industries, etc. More specifically, the present invention is related to methods of controlling a process. The method enables a more reliable and safer process control than obtainable under the prior art.

BACKGROUND

Process industries, which include mineral and oil refining, chemical and petrochemical production, fossil and nuclear power generation, parts of the food and pharmaceutical industries to name a few, are generally characterized by continuous fluid processing, with unit operations such as reactions, purification, and energy exchange. This stands in contrast with discrete parts manufacturing industries, such as electronics or automobile manufacture.

Process control systems generally consist of many direct control variables, such as flow controllers, temperature controllers, and pressure controllers, and also many indirect control variables, such as temperatures, pressures and flows that are not directly controlled, but which are affected by various process influences, including the direct controllers. The multiple interactions between the direct controllers (as well as other independent variables) and the indirect variables (or dependent variables) comprise the multivariable nature of most continuous processes.

Prior to the advent of computer-based process control systems, ca. 1980s, multivariable control, i.e. controlling direct and indirect control variables in a coordinated manner, was accomplished manually. It was part of the operator's job to adjust the direct controllers in order to keep them and the indirect variables within specified constraint limits, as well as to affect greater economic optimization, for example, to make incrementally more product, or higher quality product, or make more efficient use of raw materials and energy.

Due to the degree of unwieldiness of most industrial scale processes, their susceptibility to many sources of upsets, the often sharp safety and cost consequences of exceeding constraints, and in the absence of automatic multivariable constraint controls, process operation traditionally is kept well away from critical constraints. However, in most cases, operating away from constraints translates into additional operating expense, i.e. results in making less product or consuming more energy or raw materials. This is an essential aspect of operating most industrial scale continuous processes—keeping the process within a safe and reliable operating window, while pushing overall process economics.

With the advent of computer-based control systems and appropriate control methods in the 1980s, automated multivariable control became established as a viable and often important part of modern process control systems. With automated multivariable control, many processes are able to operate reliably closer to constraint limits and optimization targets, with potentially significant benefits in product quality, efficiency, throughput, reliability and safety.

In the process industries, the dominant method of multivariable control has been multivariable model-based predictive control (MPC). "Models" are mathematical descriptions of the process interactions between the direct control variables and the indirect control variables (or, between the independent and dependent variables). MPC uses models in its constraint control and optimization algorithms (along with cost and other factors). Since the 1980s, thousands of instances of MPC have been deployed in industry.

Its success aside, MPC has experienced several persistent shortcomings. The inventor has been a leading industry voice for understanding and improving MPC effectiveness, having published numerous trade journal articles on the topic, and has generally concluded that model-based control has a fundamental weakness in that models are inherently inaccurate (because actual process gains change dynamically), and moreover that the aggressive nature of model-based control is unnecessary and even undesirable from a process operation standpoint, where gradual constraint control and optimization is more prudent and assuring process stability is a high priority.

Multivariable control has been an active technology area in the process industries. However, to the inventor's knowledge all prior patents relate to methods of model-based control and/or optimization methods. The present invention is a method for multivariable control that is not model-based, and which is independent of any optimizer method employed. A search has revealed no other patents for a non-model-based approach to multivariable control.

In response, the inventor has developed the present invention, which inherently adapts to changes in process gain, yet is still predictive and accomplishes multivariable constraint control and optimization in a gradual manner that assures ongoing process stability, in addition to several other control and operating advantages that are described.

SUMMARY

Disclosed herein is a method of process control that includes collecting data sets for a process having an initial base layer DCV value and a corresponding initial ICV value, a rate-time value and a move series value, receiving a target ICV value and determining whether a change in DCV value is needed. The method checks for any DCV limits and implements a move series to the DCV setting. The rate-of-change of the ICV is calculated along with the estimated time needed to reach the target ICV value based on the rate-of-change. The time needed to reach the target ICV value is compared with the rate-time and the DCV move series is discontinued when the time needed to reach the target ICV value is less than a predetermined percentage of the rate-time value. The method can further include checking process stability and if an unstable condition within the process is detected the move series can be temporarily halted until stability is achieved.

While the prior art of multivariable process control employs highly complex and often unreliable calculation methods to arrive at independent variable control "moves", the present invention determines only if a positive or negative control move is needed, and then uses a fixed and continuous move size that is pre-selected based on process safety and stability criteria. This method reduces the complexity and improves the reliability of the move calculation process, and more closely reflects how operating personnel usually prefer to operate industrial processes, i.e. with cautious gradual moves to assure ongoing process stability.

DETAILED DESCRIPTION

Figure 1:
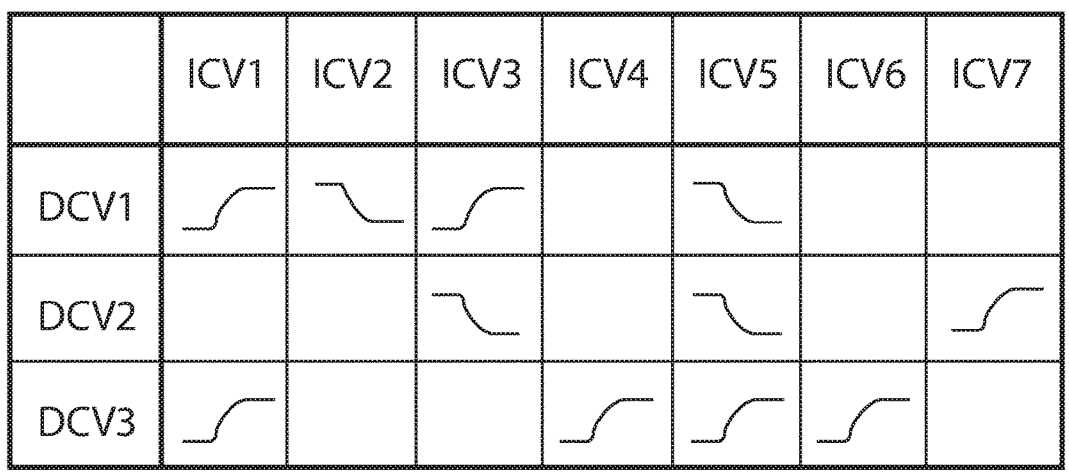
FIG. 1 is schematic of a simplified example of a process model matrix. Each mini-graph reflects the response of the ICV to a change in the DCV.

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the following description refers to the process industry, the systems and methods of the present invention are not limited thereto and may also be applied to other industries to achieve similar results.

This detailed description explains how an embodiment of the present invention, termed rate-based multivariable control (RMC), uses one direct control variable (DCV) to control one indirect control variable (ICV). The method can further be used broadly to effect multivariable control of an entire process comprised of multiple DCVs and ICVs.

In a generalized embodiment the present invention comprises a process control method that determines whether a control move is needed, implements a first move series, monitors a dependent variable rate-of-change and halts the move series whenever the dependent variable rate-of-change indicates that the dependent variable target will be met within a specified time period. The method can further monitor process stability and discontinue the control method when instability is detected.

An exemplary embodiment is a method of process control that includes collecting data sets for a process having an initial base layer DCV value and a corresponding initial ICV value, a rate-time value and a move series value. A target ICV value is received and whether a change in DCV value is needed is determined. The method checks for any DCV limits and implements a move series to the DCV setting to effect the change. The rate-of-change of the ICV is calculated along with the estimated time needed to reach the target ICV value based on the rate-of-change. The time needed to reach the target ICV value is compared with the rate-time and the DCV move series is discontinued when the time needed to reach the target ICV value is less than a predetermined percentage of the rate-time value. The method can further include checking process stability and if an unstable condition within the process is detected the move series can be temporarily halted until stability is achieved.

While the prior art of multivariable process control employs highly complex and often unreliable calculation methods to arrive at independent variable control "moves", the present invention determines only if a positive or negative control move is needed, and then uses a fixed and continuous move size that is pre-selected based on process safety and stability criteria. This method reduces the complexity and improves the reliability of the move calculation process, and more closely reflects how operating personnel usually prefer to operate industrial processes, i.e. with cautious gradual moves to assure ongoing process stability.

Those knowledgeable in the art will recognize that this approach requires some complementary mechanism to halt the moves before the dependent variable actually reaches its target value, so that it will settle at the target value without overshoot or cycling. This is accomplished by real-time monitoring of the dependent variable rate-of-change and halting the moves when process conditions indicate that doing so will result in the dependent variable ultimately settling out at the target value. This method is less complex and more reliable than the methods of the prior art, and more closely reflects how operating personnel generally prefer to operate industrial processes. Moreover, process simulations show that this method is relatively robust (insensitive) with regard to changes in process response time, and is unaffected by changes in process gain and move size. These are important characteristics from a control and operation standpoint, and have been a particular shortcoming of the prior art.

The method of the present invention for multivariable control, or any "high level" process control application, is made more reliable by the addition of stability assurance, meaning process stability is continuously monitored and the high level control application is paused or automatically switched off whenever instability is detected. Because high level control is generally intended to enhance process operation, the idea that it should be turned off during instability has never been a part of process control practice. However, the history of the prior art of multivariable control, upon study by the inventor, has revealed the prudence and logic of this safeguarding feature for any high level process control application, because in practice, the prior art, due to a number of practical shortcomings, has been known to actually cause process instability.

In an example the DCV is initially at a value of 20%. In an actual process, this could represent a flow controller setpoint. The ICV has an initial value equal to its target value of 60%. In an actual process, this could be a maximum pressure constraint or a product quality target. At time equals ten minutes, the ICV target changes to 90%. In an actual process this could be a change made by an operator, engineer, or an automatic optimizer. The gain describing the response of the ICV to changes in the DCV is positive, meaning an increase in the DCV will cause an increase in the ICV, therefore the DCV needs to be increased to bring the ICV up to the new target value.

The process response time in this example is twenty minutes, i.e. after a change in the DCV, the ICV will reach its final value in about sixty minutes (roughly three response times). The process response time is the basis for the RMC tuning parameter rate-time. Rate-time is used within RMC as follows: (1) if the current rate of change of the ICV indicates it will not reach its target value within a time period that is less than or equal to the rate-time, then further moves are continued; and (2) if the current rate of change of the ICV indicates it will reach its target value within a time period that is less than or equal to the rate-time, then further moves are discontinued, allowing the ICV to settle towards the target value. Optionally the time to reach its target value can be compared to a percentage of the rate-time, for example the move can be discontinued when the time to reach the target value is equal to 110% of the rate-time.

In an ideally behaved mathematical simulation, if the process response time equals the rate-time, then when the moves are initially discontinued, the ICV will subsequently settle at exactly the target value. This is termed the "ideal" rate-time, although in practice the rate-time may be set longer or shorter than the process response time, or may become longer or shorter if the process response time changes dynamically.

FIGS. 3a through 3f illustrate the effect of process gain, process response time, rate-time, and move size on RMC control performance, and in particular illustrate that the ideal rate-time is unaffected by changes in process gain and move size, and is only mildly affected by changes in process response time.

Figure 3A:
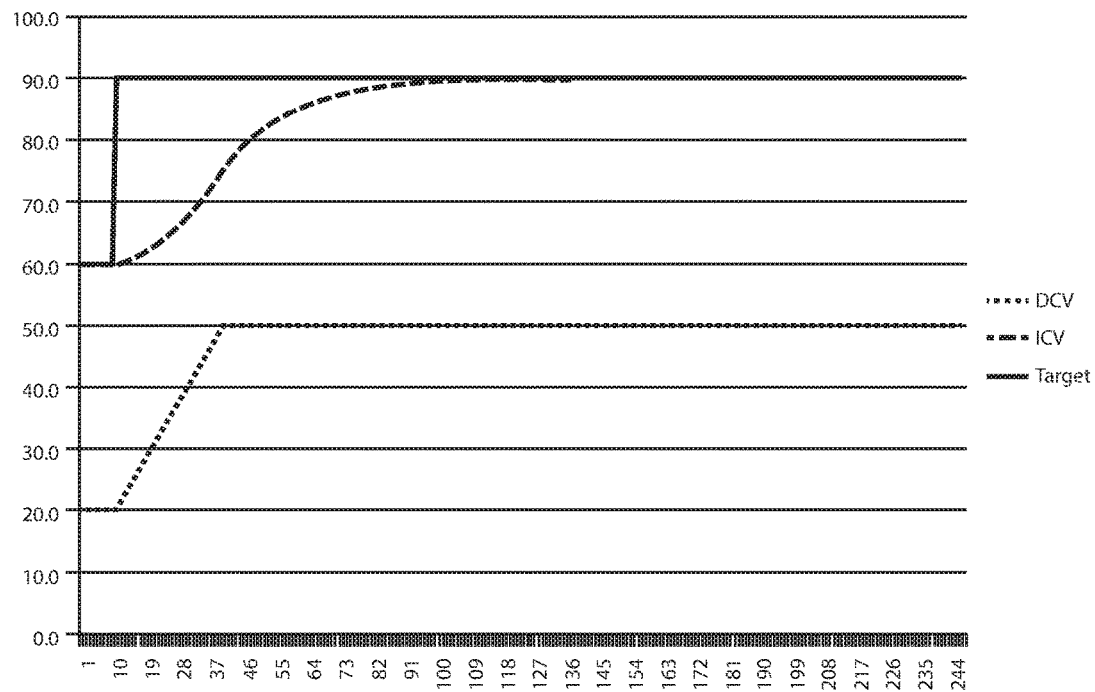
FIGS. 3a through 3f are graphical illustrations from mathematical process simulations of the present invention, illustrating the effects of changing process gain, response time, and move size.

FIG. 3a illustrates an idealized case. In this simulation, gain is 1.0, move size is 1.0, and rate-time equals the process response time of 20 minutes. When the target increases from 60% to 90% at time=10, the controller commences a DCV move series of +1.0/minute. The graph shows the target increase, the increasing DCV, and the ICV response. At time=40, the actual rate of change of the ICV (basically the slope of the ICV trace) indicates it will reach its target within one rate-time (within 20 minutes), so the move series is discontinued and the ICV ultimately settles at the target value three response times later (time=ca. 100 minutes). In this idealized case, it can be foreseen that the DCV move series will complete at a value of 50 and at time=40, because with a gain of 1.0 and a target change of 30, the DCV will need to increase by a total of 30, which occurs over a 30 minute period with a move size of 1.0. The simulation bears this out. Details of the simulation shown in FIG. 3a are listed in Table 1. It can be seen that the move series is discontinued after minute 40 when the velstop value exceeds the target value of 90.

TABLE 1

| min | mov | DCV | ICV | Target | icvvel | veldist | velstop | final icv |
|---|---|---|---|---|---|---|---|---|
| 0 | 0 | 20.0 | 60.00 | 60 | 0.00 | 0.00 | 60.00 | 60.00 |
| 1 | 0 | 20.0 | 60.00 | 60 | 0.00 | 0.00 | 60.00 | 60.00 |
| 2 | 0 | 20.0 | 60.00 | 60 | 0.00 | 0.00 | 60.00 | 60.00 |
| 3 | 0 | 20.0 | 60.00 | 60 | 0.00 | 0.00 | 60.00 | 60.00 |
| 4 | 0 | 20.0 | 60.00 | 60 | 0.00 | 0.00 | 60.00 | 60.00 |
| 5 | 0 | 20.0 | 60.00 | 60 | 0.00 | 0.00 | 60.00 | 60.00 |
| 6 | 0 | 20.0 | 60.00 | 60 | 0.00 | 0.00 | 60.00 | 60.00 |
| 7 | 0 | 20.0 | 60.00 | 60 | 0.00 | 0.00 | 60.00 | 60.00 |
| 8 | 0 | 20.0 | 60.00 | 60 | 0.00 | 0.00 | 60.00 | 60.00 |
| 9 | 0 | 20.0 | 60.00 | 60 | 0.00 | 0.00 | 60.00 | 60.00 |
| 10 | 0 | 20.0 | 60.00 | 90 | 0.00 | 0.00 | 60.00 | 60.00 |
| 11 | 1 | 21.0 | 60.05 | 90 | 0.05 | 1.00 | 61.05 | 61.00 |
| 12 | 1 | 22.0 | 60.15 | 90 | 0.10 | 1.95 | 62.10 | 62.00 |
| 13 | 1 | 23.0 | 60.29 | 90 | 0.14 | 2.85 | 63.14 | 63.00 |
| 14 | 1 | 24.0 | 60.48 | 90 | 0.19 | 3.71 | 64.19 | 64.00 |
| 15 | 1 | 25.0 | 60.70 | 90 | 0.23 | 4.52 | 65.23 | 65.00 |
| 16 | 1 | 26.0 | 60.97 | 90 | 0.26 | 5.30 | 66.26 | 66.00 |
| 17 | 1 | 27.0 | 61.27 | 90 | 0.30 | 6.03 | 67.30 | 67.00 |
| 18 | 1 | 28.0 | 61.60 | 90 | 0.34 | 6.73 | 68.34 | 68.00 |
| 19 | 1 | 29.0 | 61.97 | 90 | 0.37 | 7.40 | 69.37 | 69.00 |
| 20 | 1 | 30.0 | 62.38 | 90 | 0.40 | 8.03 | 70.40 | 70.00 |
| 21 | 1 | 31.0 | 62.81 | 90 | 0.43 | 8.62 | 71.43 | 71.00 |
| 22 | 1 | 32.0 | 63.27 | 90 | 0.46 | 9.19 | 72.46 | 72.00 |
| 23 | 1 | 33.0 | 63.75 | 90 | 0.49 | 9.73 | 73.49 | 73.00 |
| 24 | 1 | 34.0 | 64.27 | 90 | 0.51 | 10.25 | 74.51 | 74.00 |
| 25 | 1 | 35.0 | 64.80 | 90 | 0.54 | 10.73 | 75.54 | 75.00 |
| 26 | 1 | 36.0 | 65.36 | 90 | 0.56 | 11.20 | 76.56 | 76.00 |
| 27 | 1 | 37.0 | 65.94 | 90 | 0.58 | 11.64 | 77.58 | 77.00 |
| 28 | 1 | 38.0 | 66.55 | 90 | 0.60 | 12.06 | 78.60 | 78.00 |
| 29 | 1 | 39.0 | 67.17 | 90 | 0.62 | 12.45 | 79.62 | 79.00 |
| 30 | 1 | 40.0 | 67.81 | 90 | 0.64 | 12.83 | 80.64 | 80.00 |
| 31 | 1 | 41.0 | 68.47 | 90 | 0.66 | 13.19 | 81.66 | 81.00 |
| 32 | 1 | 42.0 | 69.15 | 90 | 0.68 | 13.53 | 82.68 | 82.00 |
| 33 | 1 | 43.0 | 69.84 | 90 | 0.69 | 13.85 | 83.69 | 83.00 |
| 34 | 1 | 44.0 | 70.55 | 90 | 0.71 | 14.16 | 84.71 | 84.00 |
| 35 | 1 | 45.0 | 71.27 | 90 | 0.72 | 14.45 | 85.72 | 85.00 |
| 36 | 1 | 46.0 | 72.01 | 90 | 0.74 | 14.73 | 86.74 | 86.00 |
| 37 | 1 | 47.0 | 72.76 | 90 | 0.75 | 14.99 | 87.75 | 87.00 |
| 38 | 1 | 48.0 | 73.52 | 90 | 0.76 | 15.24 | 88.76 | 88.00 |
| 39 | 1 | 49.0 | 74.29 | 90 | 0.77 | 15.48 | 89.77 | 89.00 |
| 40 | 1 | 50.0 | 75.08 | 90 | 0.79 | 15.71 | 90.79 | 90.00 |
| 41 | 0 | 50.0 | 75.82 | 90 | 0.75 | 14.92 | 90.75 | 90.00 |
| 42 | 0 | 50.0 | 76.53 | 90 | 0.71 | 14.18 | 90.71 | 90.00 |
| 43 | 0 | 50.0 | 77.21 | 90 | 0.67 | 13.47 | 90.67 | 90.00 |
| 44 | 0 | 50.0 | 77.85 | 90 | 0.64 | 12.79 | 90.64 | 90.00 |
| 45 | 0 | 50.0 | 78.45 | 90 | 0.61 | 12.15 | 90.61 | 90.00 |
| 46 | 0 | 50.0 | 79.03 | 90 | 0.58 | 11.55 | 90.58 | 90.00 |
| 47 | 0 | 50.0 | 79.58 | 90 | 0.55 | 10.97 | 90.55 | 90.00 |
| 48 | 0 | 50.0 | 80.10 | 90 | 0.52 | 10.42 | 90.52 | 90.00 |
| 49 | 0 | 50.0 | 80.60 | 90 | 0.49 | 9.90 | 90.49 | 90.00 |
| 50 | 0 | 50.0 | 81.07 | 90 | 0.47 | 9.40 | 90.47 | 90.00 |
| 51 | 0 | 50.0 | 81.51 | 90 | 0.45 | 8.93 | 90.45 | 90.00 |
| 52 | 0 | 50.0 | 81.94 | 90 | 0.42 | 8.49 | 90.42 | 90.00 |
| 53 | 0 | 50.0 | 82.34 | 90 | 0.40 | 8.06 | 90.40 | 90.00 |
| 54 | 0 | 50.0 | 82.72 | 90 | 0.38 | 7.66 | 90.38 | 90.00 |
| 55 | 0 | 50.0 | 83.09 | 90 | 0.36 | 7.28 | 90.36 | 90.00 |
| 56 | 0 | 50.0 | 83.43 | 90 | 0.35 | 6.91 | 90.35 | 90.00 |
| 57 | 0 | 50.0 | 83.76 | 90 | 0.33 | 6.57 | 90.33 | 90.00 |
| 58 | 0 | 50.0 | 84.07 | 90 | 0.31 | 6.24 | 90.31 | 90.00 |
| 59 | 0 | 50.0 | 84.37 | 90 | 0.30 | 5.93 | 90.30 | 90.00 |
| 60 | 0 | 50.0 | 84.65 | 90 | 0.28 | 5.63 | 90.28 | 90.00 |
| 61 | 0 | 50.0 | 84.92 | 90 | 0.27 | 5.35 | 90.27 | 90.00 |
| 62 | 0 | 50.0 | 85.17 | 90 | 0.25 | 5.08 | 90.25 | 90.00 |
| 63 | 0 | 50.0 | 85.41 | 90 | 0.24 | 4.83 | 90.24 | 90.00 |
| 64 | 0 | 50.0 | 85.64 | 90 | 0.23 | 4.59 | 90.23 | 90.00 |
| 65 | 0 | 50.0 | 85.86 | 90 | 0.22 | 4.36 | 90.22 | 90.00 |
| 66 | 0 | 50.0 | 86.07 | 90 | 0.21 | 4.14 | 90.21 | 90.00 |
| 67 | 0 | 50.0 | 86.26 | 90 | 0.20 | 3.93 | 90.20 | 90.00 |
| 68 | 0 | 50.0 | 86.45 | 90 | 0.19 | 3.74 | 90.19 | 90.00 |
| 69 | 0 | 50.0 | 86.63 | 90 | 0.18 | 3.55 | 90.18 | 90.00 |
| 70 | 0 | 50.0 | 86.80 | 90 | 0.17 | 3.37 | 90.17 | 90.00 |
| 71 | 0 | 50.0 | 86.96 | 90 | 0.16 | 3.20 | 90.16 | 90.00 |
| 72 | 0 | 50.0 | 87.11 | 90 | 0.15 | 3.04 | 90.15 | 90.00 |
| 73 | 0 | 50.0 | 87.25 | 90 | 0.14 | 2.89 | 90.14 | 90.00 |
| 74 | 0 | 50.0 | 87.39 | 90 | 0.14 | 2.75 | 90.14 | 90.00 |
| 75 | 0 | 50.0 | 87.52 | 90 | 0.13 | 2.61 | 90.13 | 90.00 |
| 76 | 0 | 50.0 | 87.65 | 90 | 0.12 | 2.48 | 90.12 | 90.00 |
| 77 | 0 | 50.0 | 87.76 | 90 | 0.12 | 2.35 | 90.12 | 90.00 |
| 78 | 0 | 50.0 | 87.88 | 90 | 0.11 | 2.24 | 90.11 | 90.00 |
| 79 | 0 | 50.0 | 87.98 | 90 | 0.11 | 2.12 | 90.11 | 90.00 |
| 80 | 0 | 50.0 | 88.08 | 90 | 0.10 | 2.02 | 90.10 | 90.00 |
| 81 | 0 | 50.0 | 88.18 | 90 | 0.10 | 1.92 | 90.10 | 90.00 |
| 82 | 0 | 50.0 | 88.27 | 90 | 0.09 | 1.82 | 90.09 | 90.00 |
| 83 | 0 | 50.0 | 88.36 | 90 | 0.09 | 1.73 | 90.09 | 90.00 |
| 84 | 0 | 50.0 | 88.44 | 90 | 0.08 | 1.64 | 90.08 | 90.00 |
| 85 | 0 | 50.0 | 88.52 | 90 | 0.08 | 1.56 | 90.08 | 90.00 |
| 86 | 0 | 50.0 | 88.59 | 90 | 0.07 | 1.48 | 90.07 | 90.00 |
| 87 | 0 | 50.0 | 88.66 | 90 | 0.07 | 1.41 | 90.07 | 90.00 |
| 88 | 0 | 50.0 | 88.73 | 90 | 0.07 | 1.34 | 90.07 | 90.00 |
| 89 | 0 | 50.0 | 88.79 | 90 | 0.06 | 1.27 | 90.06 | 90.00 |
| 90 | 0 | 50.0 | 88.85 | 90 | 0.06 | 1.21 | 90.06 | 90.00 |
| 91 | 0 | 50.0 | 88.91 | 90 | 0.06 | 1.15 | 90.06 | 90.00 |
| 92 | 0 | 50.0 | 88.96 | 90 | 0.05 | 1.09 | 90.05 | 90.00 |
| 93 | 0 | 50.0 | 89.02 | 90 | 0.05 | 1.04 | 90.05 | 90.00 |
| 94 | 0 | 50.0 | 89.06 | 90 | 0.05 | 0.98 | 90.05 | 90.00 |

TABLE 1-continued

| min | mov | DCV | ICV | Target | icvvel | veldist | velstop | final icv |
|---|---|---|---|---|---|---|---|---|
| 95 | 0 | 50.0 | 89.11 | 90 | 0.05 | 0.94 | 90.05 | 90.00 |
| 96 | 0 | 50.0 | 89.16 | 90 | 0.04 | 0.89 | 90.04 | 90.00 |
| 97 | 0 | 50.0 | 89.20 | 90 | 0.04 | 0.84 | 90.04 | 90.00 |
| 98 | 0 | 50.0 | 89.24 | 90 | 0.04 | 0.80 | 90.04 | 90.00 |

Figure 3B:
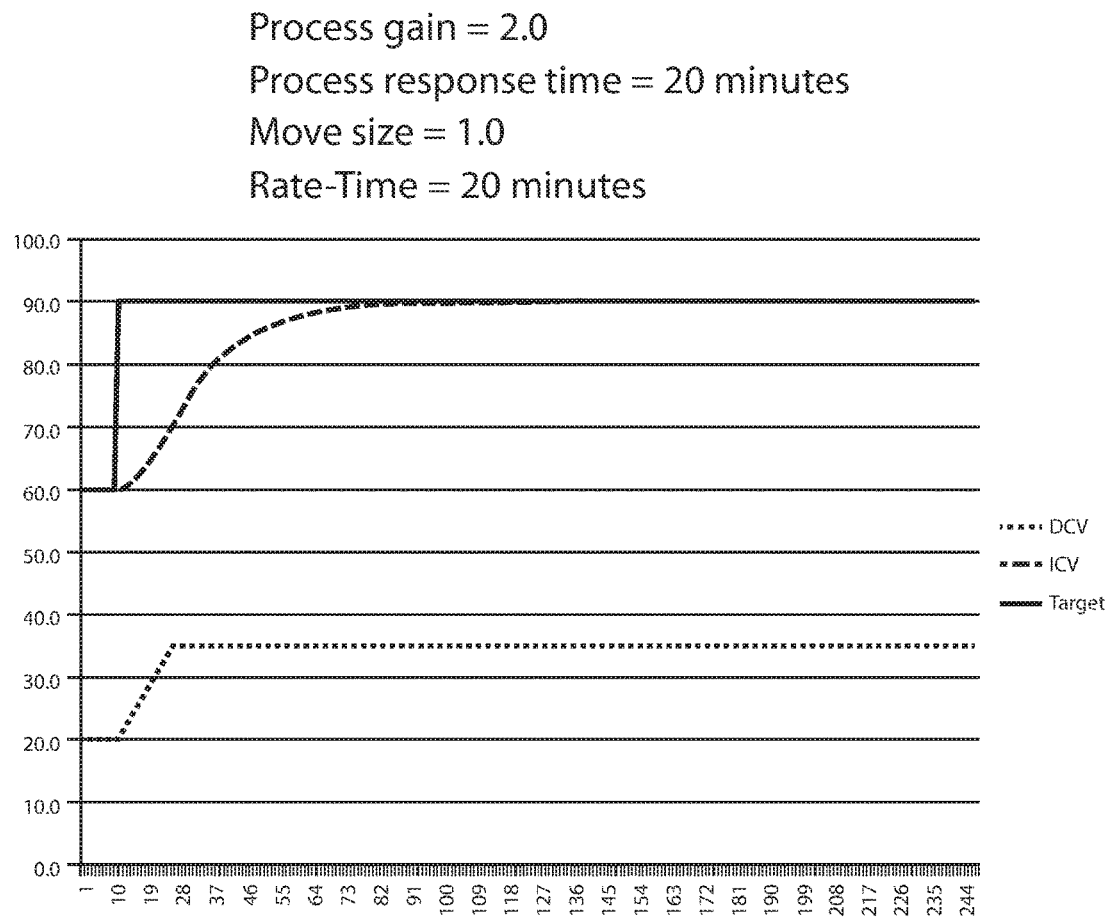

FIG. 3b illustrates that the method is independent of actual process gain and in fact adapts to actual process gain in real-time. In FIG. 3b, the process gain is 2.0 (twice the original gain). This means the DCV needs to move only half as much, which takes half as long at a constant move size, but because rate-time still reflects process response time, the method still lands the ICV on target. This inherent adaptation to a changing process gain is an important aspect of the invention, because changes in process gain are a reality for most processes and a fundamental problem for model-based control in the prior art. In model-based control, as well as in traditional feedback proportional-integral-derivative (PID) control, control performance degrades rapidly, typically with increasingly severe oscillations, as process gain increases and generally when process gain increases beyond a factor of two, control becomes completely unstable and results in oscillations of growing, rather than decaying, amplitude. As the example of FIG. 3b illustrates, control performance under the present invention is unaffected by even a doubling of process gain. Details of the simulation shown in FIG. 3b are listed in Table 2.

TABLE 2

| min | mov | DCV | ICV | Target | icvvel | veldist | velstop | final icv |
|---|---|---|---|---|---|---|---|---|
| 0 | 0 | 20.0 | 60.00 | 60 | 0.00 | 0.00 | 60.00 | 60.00 |
| 1 | 0 | 20.0 | 60.00 | 60 | 0.00 | 0.00 | 60.00 | 60.00 |
| 2 | 0 | 20.0 | 60.00 | 60 | 0.00 | 0.00 | 60.00 | 60.00 |
| 3 | 0 | 20.0 | 60.00 | 60 | 0.00 | 0.00 | 60.00 | 60.00 |
| 4 | 0 | 20.0 | 60.00 | 60 | 0.00 | 0.00 | 60.00 | 60.00 |
| 5 | 0 | 20.0 | 60.00 | 60 | 0.00 | 0.00 | 60.00 | 60.00 |
| 6 | 0 | 20.0 | 60.00 | 60 | 0.00 | 0.00 | 60.00 | 60.00 |
| 7 | 0 | 20.0 | 60.00 | 60 | 0.00 | 0.00 | 60.00 | 60.00 |
| 8 | 0 | 20.0 | 60.00 | 60 | 0.00 | 0.00 | 60.00 | 60.00 |
| 9 | 0 | 20.0 | 60.00 | 60 | 0.00 | 0.00 | 60.00 | 60.00 |
| 10 | 0 | 20.0 | 60.00 | 90 | 0.00 | 0.00 | 60.00 | 60.00 |
| 11 | 1 | 21.0 | 60.10 | 90 | 0.10 | 2.00 | 62.10 | 62.00 |
| 12 | 1 | 22.0 | 60.30 | 90 | 0.20 | 3.90 | 64.20 | 64.00 |
| 13 | 1 | 23.0 | 60.58 | 90 | 0.29 | 5.70 | 66.29 | 66.00 |
| 14 | 1 | 24.0 | 60.95 | 90 | 0.37 | 7.42 | 68.37 | 68.00 |
| 15 | 1 | 25.0 | 61.40 | 90 | 0.45 | 9.05 | 70.45 | 70.00 |
| 16 | 1 | 26.0 | 61.93 | 90 | 0.53 | 10.60 | 72.53 | 72.00 |
| 17 | 1 | 27.0 | 62.54 | 90 | 0.60 | 12.07 | 74.60 | 74.00 |
| 18 | 1 | 28.0 | 63.21 | 90 | 0.67 | 13.46 | 76.67 | 76.00 |
| 19 | 1 | 29.0 | 63.95 | 90 | 0.74 | 14.79 | 78.74 | 78.00 |
| 20 | 1 | 30.0 | 64.75 | 90 | 0.80 | 16.05 | 80.80 | 80.00 |
| 21 | 1 | 31.0 | 65.61 | 90 | 0.86 | 17.25 | 82.86 | 82.00 |
| 22 | 1 | 32.0 | 66.53 | 90 | 0.92 | 18.39 | 84.92 | 84.00 |
| 23 | 1 | 33.0 | 67.51 | 90 | 0.97 | 19.47 | 86.97 | 86.00 |
| 24 | 1 | 34.0 | 68.53 | 90 | 1.02 | 20.49 | 89.02 | 88.00 |
| 25 | 1 | 35.0 | 69.61 | 90 | 1.07 | 21.47 | 91.07 | 90.00 |
| 26 | 0 | 35.0 | 70.62 | 90 | 1.02 | 20.39 | 91.02 | 90.00 |
| 27 | 0 | 35.0 | 71.59 | 90 | 0.97 | 19.38 | 90.97 | 90.00 |
| 28 | 0 | 35.0 | 72.51 | 90 | 0.92 | 18.41 | 90.92 | 90.00 |
| 29 | 0 | 35.0 | 73.39 | 90 | 0.87 | 17.49 | 90.87 | 90.00 |
| 30 | 0 | 35.0 | 74.22 | 90 | 0.83 | 16.61 | 90.83 | 90.00 |
| 31 | 0 | 35.0 | 75.01 | 90 | 0.79 | 15.78 | 90.79 | 90.00 |
| 32 | 0 | 35.0 | 75.76 | 90 | 0.75 | 14.99 | 90.75 | 90.00 |
| 33 | 0 | 35.0 | 76.47 | 90 | 0.71 | 14.24 | 90.71 | 90.00 |
| 34 | 0 | 35.0 | 77.15 | 90 | 0.68 | 13.53 | 90.68 | 90.00 |
| 35 | 0 | 35.0 | 77.79 | 90 | 0.64 | 12.85 | 90.64 | 90.00 |
| 36 | 0 | 35.0 | 78.40 | 90 | 0.61 | 12.21 | 90.61 | 90.00 |
| 37 | 0 | 35.0 | 78.98 | 90 | 0.58 | 11.60 | 90.58 | 90.00 |

TABLE 2-continued

| min | mov | DCV | ICV | Target | icvvel | veldist | velstop | final icv |
|---|---|---|---|---|---|---|---|---|
| 38 | 0 | 35.0 | 79.53 | 90 | 0.55 | 11.02 | 90.55 | 90.00 |
| 39 | 0 | 35.0 | 80.05 | 90 | 0.52 | 10.47 | 90.52 | 90.00 |
| 40 | 0 | 35.0 | 80.55 | 90 | 0.50 | 9.95 | 90.50 | 90.00 |
| 41 | 0 | 35.0 | 81.02 | 90 | 0.47 | 9.45 | 90.47 | 90.00 |
| 42 | 0 | 35.0 | 81.47 | 90 | 0.45 | 8.98 | 90.45 | 90.00 |
| 43 | 0 | 35.0 | 81.90 | 90 | 0.43 | 8.53 | 90.43 | 90.00 |
| 44 | 0 | 35.0 | 82.30 | 90 | 0.41 | 8.10 | 90.41 | 90.00 |
| 45 | 0 | 35.0 | 82.69 | 90 | 0.38 | 7.70 | 90.38 | 90.00 |
| 46 | 0 | 35.0 | 83.05 | 90 | 0.37 | 7.31 | 90.37 | 90.00 |
| 47 | 0 | 35.0 | 83.40 | 90 | 0.35 | 6.95 | 90.35 | 90.00 |
| 48 | 0 | 35.0 | 83.73 | 90 | 0.33 | 6.60 | 90.33 | 90.00 |
| 49 | 0 | 35.0 | 84.04 | 90 | 0.31 | 6.27 | 90.31 | 90.00 |
| 50 | 0 | 35.0 | 84.34 | 90 | 0.30 | 5.96 | 90.30 | 90.00 |
| 51 | 0 | 35.0 | 84.63 | 90 | 0.28 | 5.66 | 90.28 | 90.00 |
| 52 | 0 | 35.0 | 84.89 | 90 | 0.27 | 5.37 | 90.27 | 90.00 |
| 53 | 0 | 35.0 | 85.15 | 90 | 0.26 | 5.11 | 90.26 | 90.00 |
| 54 | 0 | 35.0 | 85.39 | 90 | 0.24 | 4.85 | 90.24 | 90.00 |
| 55 | 0 | 35.0 | 85.62 | 90 | 0.23 | 4.61 | 90.23 | 90.00 |
| 56 | 0 | 35.0 | 85.84 | 90 | 0.22 | 4.38 | 90.22 | 90.00 |
| 57 | 0 | 35.0 | 86.05 | 90 | 0.21 | 4.16 | 90.21 | 90.00 |
| 58 | 0 | 35.0 | 86.25 | 90 | 0.20 | 3.95 | 90.20 | 90.00 |
| 59 | 0 | 35.0 | 86.43 | 90 | 0.19 | 3.75 | 90.19 | 90.00 |
| 60 | 0 | 35.0 | 86.61 | 90 | 0.18 | 3.57 | 90.18 | 90.00 |
| 61 | 0 | 35.0 | 86.78 | 90 | 0.17 | 3.39 | 90.17 | 90.00 |
| 62 | 0 | 35.0 | 86.94 | 90 | 0.16 | 3.22 | 90.16 | 90.00 |
| 63 | 0 | 35.0 | 87.10 | 90 | 0.15 | 3.06 | 90.15 | 90.00 |
| 64 | 0 | 35.0 | 87.24 | 90 | 0.15 | 2.90 | 90.15 | 90.00 |
| 65 | 0 | 35.0 | 87.38 | 90 | 0.14 | 2.76 | 90.14 | 90.00 |
| 66 | 0 | 35.0 | 87.51 | 90 | 0.13 | 2.62 | 90.13 | 90.00 |
| 67 | 0 | 35.0 | 87.63 | 90 | 0.12 | 2.49 | 90.12 | 90.00 |
| 68 | 0 | 35.0 | 87.75 | 90 | 0.12 | 2.37 | 90.12 | 90.00 |
| 69 | 0 | 35.0 | 87.87 | 90 | 0.11 | 2.25 | 90.11 | 90.00 |
| 70 | 0 | 35.0 | 87.97 | 90 | 0.11 | 2.13 | 90.11 | 90.00 |
| 71 | 0 | 35.0 | 88.07 | 90 | 0.10 | 2.03 | 90.10 | 90.00 |
| 72 | 0 | 35.0 | 88.17 | 90 | 0.10 | 1.93 | 90.10 | 90.00 |
| 73 | 0 | 35.0 | 88.26 | 90 | 0.09 | 1.83 | 90.09 | 90.00 |
| 74 | 0 | 35.0 | 88.35 | 90 | 0.09 | 1.74 | 90.09 | 90.00 |
| 75 | 0 | 35.0 | 88.43 | 90 | 0.08 | 1.65 | 90.08 | 90.00 |
| 76 | 0 | 35.0 | 88.51 | 90 | 0.08 | 1.57 | 90.08 | 90.00 |
| 77 | 0 | 35.0 | 88.58 | 90 | 0.07 | 1.49 | 90.07 | 90.00 |
| 78 | 0 | 35.0 | 88.65 | 90 | 0.07 | 1.42 | 90.07 | 90.00 |
| 79 | 0 | 35.0 | 88.72 | 90 | 0.07 | 1.35 | 90.07 | 90.00 |
| 80 | 0 | 35.0 | 88.79 | 90 | 0.06 | 1.28 | 90.06 | 90.00 |
| 81 | 0 | 35.0 | 88.85 | 90 | 0.06 | 1.21 | 90.06 | 90.00 |
| 82 | 0 | 35.0 | 88.90 | 90 | 0.06 | 1.15 | 90.06 | 90.00 |
| 83 | 0 | 35.0 | 88.96 | 90 | 0.05 | 1.10 | 90.05 | 90.00 |
| 84 | 0 | 35.0 | 89.01 | 90 | 0.05 | 1.04 | 90.05 | 90.00 |
| 85 | 0 | 35.0 | 89.06 | 90 | 0.05 | 0.99 | 90.05 | 90.00 |
| 86 | 0 | 35.0 | 89.11 | 90 | 0.05 | 0.94 | 90.05 | 90.00 |
| 87 | 0 | 35.0 | 89.15 | 90 | 0.04 | 0.89 | 90.04 | 90.00 |
| 88 | 0 | 35.0 | 89.19 | 90 | 0.04 | 0.85 | 90.04 | 90.00 |
| 89 | 0 | 35.0 | 89.23 | 90 | 0.04 | 0.81 | 90.04 | 90.00 |
| 90 | 0 | 35.0 | 89.27 | 90 | 0.04 | 0.77 | 90.04 | 90.00 |
| 91 | 0 | 35.0 | 89.31 | 90 | 0.04 | 0.73 | 90.04 | 90.00 |
| 92 | 0 | 35.0 | 89.34 | 90 | 0.03 | 0.69 | 90.03 | 90.00 |
| 93 | 0 | 35.0 | 89.38 | 90 | 0.03 | 0.66 | 90.03 | 90.00 |
| 94 | 0 | 35.0 | 89.41 | 90 | 0.03 | 0.62 | 90.03 | 90.00 |
| 95 | 0 | 35.0 | 89.44 | 90 | 0.03 | 0.59 | 90.03 | 90.00 |
| 96 | 0 | 35.0 | 89.47 | 90 | 0.03 | 0.56 | 90.03 | 90.00 |
| 97 | 0 | 35.0 | 89.49 | 90 | 0.03 | 0.53 | 90.03 | 90.00 |
| 98 | 0 | 35.0 | 89.52 | 90 | 0.03 | 0.51 | 90.03 | 90.00 |
| 99 | 0 | 35.0 | 89.54 | 90 | 0.02 | 0.48 | 90.02 | 90.00 |
| 100 | 0 | 35.0 | 89.56 | 90 | 0.02 | 0.46 | 90.02 | 90.00 |

Figure 3C:
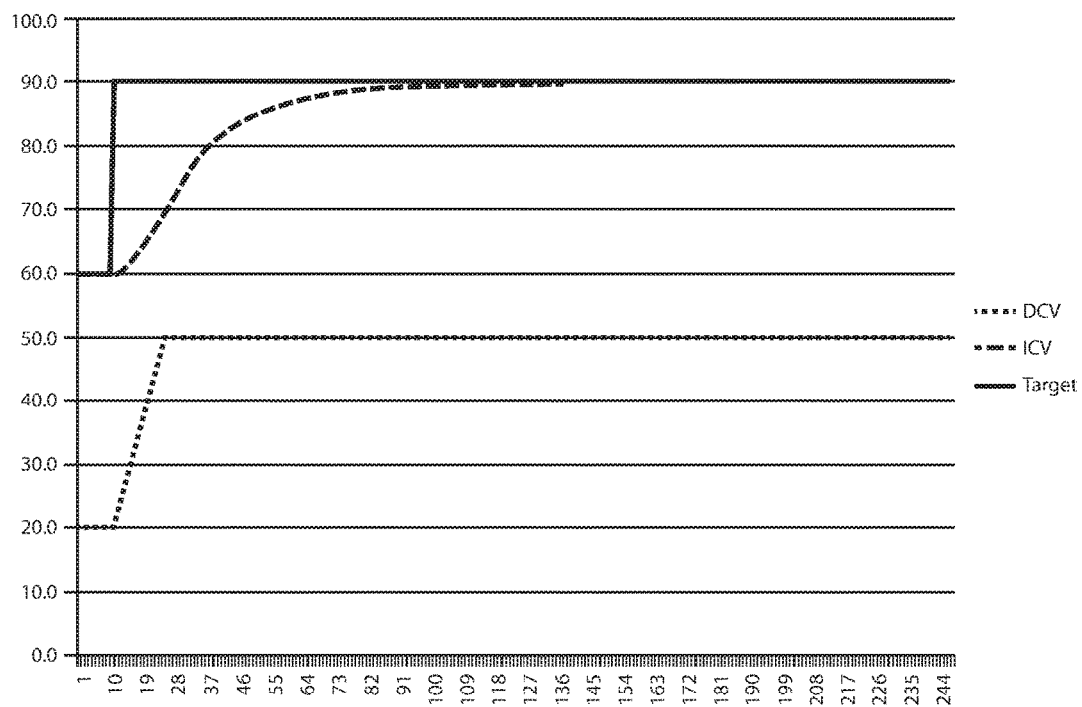

FIG. 3c illustrates that the method is independent of move size, which means move size can be adjusted without undermining quality of control. In FIG. 3c, the move size is 2.0 (twice the original move size), so that the DCV moves are completed in half the time, but the ICV again lands on target. This illustrates the independence of the method to changes in move size, which is important, as this is a parameter operations personnel may want to adjust based on ongoing operational experience. Details of the simulation shown in FIG. 3c are listed in Table 3.

TABLE 3

| min | mov | DCV | ICV | Target | icvvel | veldist | velstop | final icv |
|---|---|---|---|---|---|---|---|---|
| 0 | 0 | 20.0 | 60.00 | 60 | 0.00 | 0.00 | 60.00 | 60.00 |
| 1 | 0 | 20.0 | 60.00 | 60 | 0.00 | 0.00 | 60.00 | 60.00 |
| 2 | 0 | 20.0 | 60.00 | 60 | 0.00 | 0.00 | 60.00 | 60.00 |
| 3 | 0 | 20.0 | 60.00 | 60 | 0.00 | 0.00 | 60.00 | 60.00 |
| 4 | 0 | 20.0 | 60.00 | 60 | 0.00 | 0.00 | 60.00 | 60.00 |
| 5 | 0 | 20.0 | 60.00 | 60 | 0.00 | 0.00 | 60.00 | 60.00 |
| 6 | 0 | 20.0 | 60.00 | 60 | 0.00 | 0.00 | 60.00 | 60.00 |
| 7 | 0 | 20.0 | 60.00 | 60 | 0.00 | 0.00 | 60.00 | 60.00 |
| 8 | 0 | 20.0 | 60.00 | 60 | 0.00 | 0.00 | 60.00 | 60.00 |
| 9 | 0 | 20.0 | 60.00 | 60 | 0.00 | 0.00 | 60.00 | 60.00 |
| 10 | 0 | 20.0 | 60.00 | 90 | 0.00 | 0.00 | 60.00 | 60.00 |
| 11 | 2 | 22.0 | 60.10 | 90 | 0.10 | 2.00 | 62.10 | 62.00 |
| 12 | 2 | 24.0 | 60.30 | 90 | 0.20 | 3.90 | 64.20 | 64.00 |
| 13 | 2 | 26.0 | 60.58 | 90 | 0.29 | 5.70 | 66.29 | 66.00 |
| 14 | 2 | 28.0 | 60.95 | 90 | 0.37 | 7.42 | 68.37 | 68.00 |
| 15 | 2 | 30.0 | 61.40 | 90 | 0.45 | 9.05 | 70.45 | 70.00 |
| 16 | 2 | 32.0 | 61.93 | 90 | 0.53 | 10.60 | 72.53 | 72.00 |
| 17 | 2 | 34.0 | 62.54 | 90 | 0.60 | 12.07 | 74.60 | 74.00 |
| 18 | 2 | 36.0 | 63.21 | 90 | 0.67 | 13.46 | 76.67 | 76.00 |
| 19 | 2 | 38.0 | 63.95 | 90 | 0.74 | 14.79 | 78.74 | 78.00 |
| 20 | 2 | 40.0 | 64.75 | 90 | 0.80 | 16.05 | 80.80 | 80.00 |
| 21 | 2 | 42.0 | 65.61 | 90 | 0.86 | 17.25 | 82.86 | 82.00 |
| 22 | 2 | 44.0 | 66.53 | 90 | 0.92 | 18.39 | 84.92 | 84.00 |
| 23 | 2 | 46.0 | 67.51 | 90 | 0.97 | 19.47 | 86.97 | 86.00 |
| 24 | 2 | 48.0 | 68.53 | 90 | 1.02 | 20.49 | 89.02 | 88.00 |
| 25 | 2 | 50.0 | 69.61 | 90 | 1.07 | 21.47 | 91.07 | 90.00 |
| 26 | 0 | 50.0 | 70.62 | 90 | 1.02 | 20.39 | 91.02 | 90.00 |
| 27 | 0 | 50.0 | 71.59 | 90 | 0.97 | 19.38 | 90.97 | 90.00 |
| 28 | 0 | 50.0 | 72.51 | 90 | 0.92 | 18.41 | 90.92 | 90.00 |
| 29 | 0 | 50.0 | 73.39 | 90 | 0.87 | 17.49 | 90.87 | 90.00 |
| 30 | 0 | 50.0 | 74.22 | 90 | 0.83 | 16.61 | 90.83 | 90.00 |
| 31 | 0 | 50.0 | 75.01 | 90 | 0.79 | 15.78 | 90.79 | 90.00 |
| 32 | 0 | 50.0 | 75.76 | 90 | 0.75 | 14.99 | 90.75 | 90.00 |
| 33 | 0 | 50.0 | 76.47 | 90 | 0.71 | 14.24 | 90.71 | 90.00 |
| 34 | 0 | 50.0 | 77.15 | 90 | 0.68 | 13.53 | 90.68 | 90.00 |
| 35 | 0 | 50.0 | 77.79 | 90 | 0.64 | 12.85 | 90.64 | 90.00 |
| 36 | 0 | 50.0 | 78.40 | 90 | 0.61 | 12.21 | 90.61 | 90.00 |
| 37 | 0 | 50.0 | 78.98 | 90 | 0.58 | 11.60 | 90.58 | 90.00 |
| 38 | 0 | 50.0 | 79.53 | 90 | 0.55 | 11.02 | 90.55 | 90.00 |
| 39 | 0 | 50.0 | 80.05 | 90 | 0.52 | 10.47 | 90.52 | 90.00 |
| 40 | 0 | 50.0 | 80.55 | 90 | 0.50 | 9.95 | 90.50 | 90.00 |
| 41 | 0 | 50.0 | 81.02 | 90 | 0.47 | 9.45 | 90.47 | 90.00 |
| 42 | 0 | 50.0 | 81.47 | 90 | 0.45 | 8.98 | 90.45 | 90.00 |
| 43 | 0 | 50.0 | 81.90 | 90 | 0.43 | 8.53 | 90.43 | 90.00 |
| 44 | 0 | 50.0 | 82.30 | 90 | 0.41 | 8.10 | 90.41 | 90.00 |
| 45 | 0 | 50.0 | 82.69 | 90 | 0.38 | 7.70 | 90.38 | 90.00 |
| 46 | 0 | 50.0 | 83.05 | 90 | 0.37 | 7.31 | 90.37 | 90.00 |
| 47 | 0 | 50.0 | 83.40 | 90 | 0.35 | 6.95 | 90.35 | 90.00 |
| 48 | 0 | 50.0 | 83.73 | 90 | 0.33 | 6.60 | 90.33 | 90.00 |
| 49 | 0 | 50.0 | 84.04 | 90 | 0.31 | 6.27 | 90.31 | 90.00 |
| 50 | 0 | 50.0 | 84.34 | 90 | 0.30 | 5.96 | 90.30 | 90.00 |
| 51 | 0 | 50.0 | 84.63 | 90 | 0.28 | 5.66 | 90.28 | 90.00 |
| 52 | 0 | 50.0 | 84.89 | 90 | 0.27 | 5.37 | 90.27 | 90.00 |
| 53 | 0 | 50.0 | 85.15 | 90 | 0.26 | 5.11 | 90.26 | 90.00 |
| 54 | 0 | 50.0 | 85.39 | 90 | 0.24 | 4.85 | 90.24 | 90.00 |
| 55 | 0 | 50.0 | 85.62 | 90 | 0.23 | 4.61 | 90.23 | 90.00 |
| 56 | 0 | 50.0 | 85.84 | 90 | 0.22 | 4.38 | 90.22 | 90.00 |
| 57 | 0 | 50.0 | 86.05 | 90 | 0.21 | 4.16 | 90.21 | 90.00 |
| 58 | 0 | 50.0 | 86.25 | 90 | 0.20 | 3.95 | 90.20 | 90.00 |
| 59 | 0 | 50.0 | 86.43 | 90 | 0.19 | 3.75 | 90.19 | 90.00 |
| 60 | 0 | 50.0 | 86.61 | 90 | 0.18 | 3.57 | 90.18 | 90.00 |
| 61 | 0 | 50.0 | 86.78 | 90 | 0.17 | 3.39 | 90.17 | 90.00 |
| 62 | 0 | 50.0 | 86.94 | 90 | 0.16 | 3.22 | 90.16 | 90.00 |
| 63 | 0 | 50.0 | 87.10 | 90 | 0.15 | 3.06 | 90.15 | 90.00 |
| 64 | 0 | 50.0 | 87.24 | 90 | 0.15 | 2.90 | 90.15 | 90.00 |
| 65 | 0 | 50.0 | 87.38 | 90 | 0.14 | 2.76 | 90.14 | 90.00 |
| 66 | 0 | 50.0 | 87.51 | 90 | 0.13 | 2.62 | 90.13 | 90.00 |
| 67 | 0 | 50.0 | 87.63 | 90 | 0.12 | 2.49 | 90.12 | 90.00 |
| 68 | 0 | 50.0 | 87.75 | 90 | 0.12 | 2.37 | 90.12 | 90.00 |
| 69 | 0 | 50.0 | 87.87 | 90 | 0.11 | 2.25 | 90.11 | 90.00 |
| 70 | 0 | 50.0 | 87.97 | 90 | 0.11 | 2.13 | 90.11 | 90.00 |
| 71 | 0 | 50.0 | 88.07 | 90 | 0.10 | 2.03 | 90.10 | 90.00 |
| 72 | 0 | 50.0 | 88.17 | 90 | 0.10 | 1.93 | 90.10 | 90.00 |
| 73 | 0 | 50.0 | 88.26 | 90 | 0.09 | 1.83 | 90.09 | 90.00 |
| 74 | 0 | 50.0 | 88.35 | 90 | 0.09 | 1.74 | 90.09 | 90.00 |
| 75 | 0 | 50.0 | 88.43 | 90 | 0.08 | 1.65 | 90.08 | 90.00 |
| 76 | 0 | 50.0 | 88.51 | 90 | 0.08 | 1.57 | 90.08 | 90.00 |
| 77 | 0 | 50.0 | 88.58 | 90 | 0.07 | 1.49 | 90.07 | 90.00 |
| 78 | 0 | 50.0 | 88.65 | 90 | 0.07 | 1.42 | 90.07 | 90.00 |
| 79 | 0 | 50.0 | 88.72 | 90 | 0.07 | 1.35 | 90.07 | 90.00 |
| 80 | 0 | 50.0 | 88.79 | 90 | 0.06 | 1.28 | 90.06 | 90.00 |
| 81 | 0 | 50.0 | 88.85 | 90 | 0.06 | 1.21 | 90.06 | 90.00 |
| 82 | 0 | 50.0 | 88.90 | 90 | 0.06 | 1.15 | 90.06 | 90.00 |
| 83 | 0 | 50.0 | 88.96 | 90 | 0.05 | 1.10 | 90.05 | 90.00 |
| 84 | 0 | 50.0 | 89.01 | 90 | 0.05 | 1.04 | 90.05 | 90.00 |
| 85 | 0 | 50.0 | 89.06 | 90 | 0.05 | 0.99 | 90.05 | 90.00 |
| 86 | 0 | 50.0 | 89.11 | 90 | 0.05 | 0.94 | 90.05 | 90.00 |
| 87 | 0 | 50.0 | 89.15 | 90 | 0.04 | 0.89 | 90.04 | 90.00 |
| 88 | 0 | 50.0 | 89.19 | 90 | 0.04 | 0.85 | 90.04 | 90.00 |
| 89 | 0 | 50.0 | 89.23 | 90 | 0.04 | 0.81 | 90.04 | 90.00 |
| 90 | 0 | 50.0 | 89.27 | 90 | 0.04 | 0.77 | 90.04 | 90.00 |
| 91 | 0 | 50.0 | 89.31 | 90 | 0.04 | 0.73 | 90.04 | 90.00 |
| 92 | 0 | 50.0 | 89.34 | 90 | 0.03 | 0.69 | 90.03 | 90.00 |
| 93 | 0 | 50.0 | 89.38 | 90 | 0.03 | 0.66 | 90.03 | 90.00 |
| 94 | 0 | 50.0 | 89.41 | 90 | 0.03 | 0.62 | 90.03 | 90.00 |
| 95 | 0 | 50.0 | 89.44 | 90 | 0.03 | 0.59 | 90.03 | 90.00 |
| 96 | 0 | 50.0 | 89.47 | 90 | 0.03 | 0.56 | 90.03 | 90.00 |
| 97 | 0 | 50.0 | 89.49 | 90 | 0.03 | 0.53 | 90.03 | 90.00 |
| 98 | 0 | 50.0 | 89.52 | 90 | 0.03 | 0.51 | 90.03 | 90.00 |
| 99 | 0 | 50.0 | 89.54 | 90 | 0.02 | 0.48 | 90.02 | 90.00 |
| 100 | 0 | 50.0 | 89.56 | 90 | 0.02 | 0.46 | 90.02 | 90.00 |

Figure 3D:
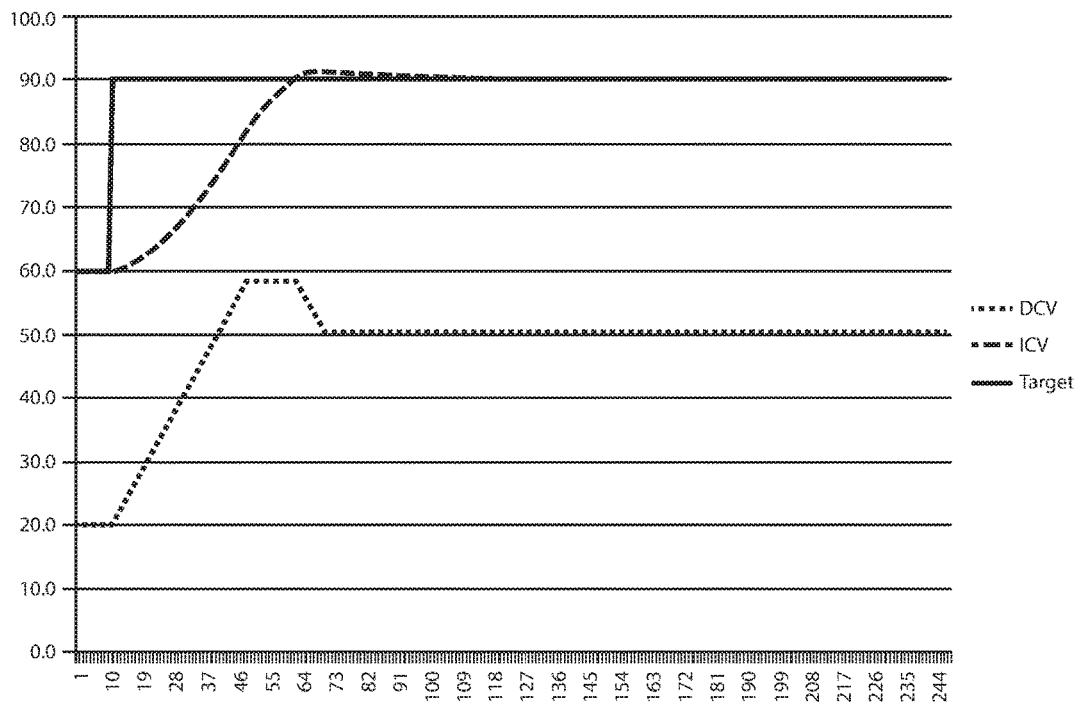
Figure 3E:
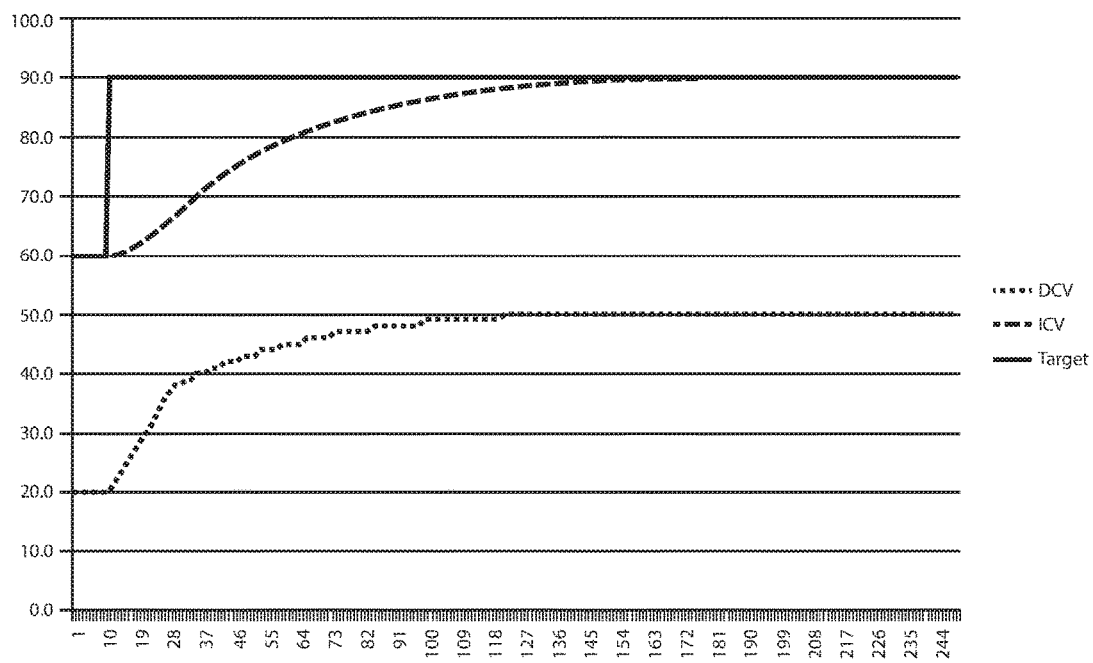

FIGS. 3d and 3e illustrate the effect of rate-time relative to actual process response time. In FIG. 3d, the rate-time is 10 minutes (half the original value), resulting in modest overshoot and ultimately requiring corrective control moves in the reverse direction. In FIG. 3e, the rate time is 40 minutes (twice the original value), ultimately requiring additional control moves in the same direction, after the moves are initially discontinued. This shows that, while the "ideal" rate-time is equal to process response time, a wide range of rate-time values will result in reliable control, which is important because actual process response times often vary. In practice, most people will want the rate-time to be equal to or greater than the actual process response time, as gradual control with little or no overshoot, and erring on the side of undershoot, is generally preferred in high level process control. Details of the simulation shown in FIG. 3d are listed in Table 4.

TABLE 4

| min | mov | DCV | ICV | Target | icvvel | veldist | velstop | final icv |
|---|---|---|---|---|---|---|---|---|
| 0 | 0 | 20.0 | 60.00 | 60 | 0.00 | 0.00 | 60.00 | 60.00 |
| 1 | 0 | 20.0 | 60.00 | 60 | 0.00 | 0.00 | 60.00 | 60.00 |
| 2 | 0 | 20.0 | 60.00 | 60 | 0.00 | 0.00 | 60.00 | 60.00 |
| 3 | 0 | 20.0 | 60.00 | 60 | 0.00 | 0.00 | 60.00 | 60.00 |
| 4 | 0 | 20.0 | 60.00 | 60 | 0.00 | 0.00 | 60.00 | 60.00 |
| 5 | 0 | 20.0 | 60.00 | 60 | 0.00 | 0.00 | 60.00 | 60.00 |
| 6 | 0 | 20.0 | 60.00 | 60 | 0.00 | 0.00 | 60.00 | 60.00 |
| 7 | 0 | 20.0 | 60.00 | 60 | 0.00 | 0.00 | 60.00 | 60.00 |
| 8 | 0 | 20.0 | 60.00 | 60 | 0.00 | 0.00 | 60.00 | 60.00 |
| 9 | 0 | 20.0 | 60.00 | 60 | 0.00 | 0.00 | 60.00 | 60.00 |
| 10 | 0 | 20.0 | 60.00 | 90 | 0.00 | 0.00 | 60.00 | 60.00 |
| 11 | 1 | 21.0 | 60.05 | 90 | 0.05 | 0.50 | 60.55 | 61.00 |
| 12 | 1 | 22.0 | 60.15 | 90 | 0.10 | 0.97 | 61.12 | 62.00 |
| 13 | 1 | 23.0 | 60.29 | 90 | 0.14 | 1.43 | 61.72 | 63.00 |
| 14 | 1 | 24.0 | 60.48 | 90 | 0.19 | 1.85 | 62.33 | 64.00 |
| 15 | 1 | 25.0 | 60.70 | 90 | 0.23 | 2.26 | 62.96 | 65.00 |
| 16 | 1 | 26.0 | 60.97 | 90 | 0.26 | 2.65 | 63.62 | 66.00 |
| 17 | 1 | 27.0 | 61.27 | 90 | 0.30 | 3.02 | 64.29 | 67.00 |
| 18 | 1 | 28.0 | 61.60 | 90 | 0.34 | 3.37 | 64.97 | 68.00 |
| 19 | 1 | 29.0 | 61.97 | 90 | 0.37 | 3.70 | 65.67 | 69.00 |
| 20 | 1 | 30.0 | 62.38 | 90 | 0.40 | 4.01 | 66.39 | 70.00 |
| 21 | 1 | 31.0 | 62.81 | 90 | 0.43 | 4.31 | 67.12 | 71.00 |
| 22 | 1 | 32.0 | 63.27 | 90 | 0.46 | 4.60 | 67.86 | 72.00 |

TABLE 4-continued

| min | mov | DCV | ICV | Target | icvvel | veldist | velstop | final icv |
|---|---|---|---|---|---|---|---|---|
| 23 | 1 | 33.0 | 63.75 | 90 | 0.49 | 4.87 | 68.62 | 73.00 |
| 24 | 1 | 34.0 | 64.27 | 90 | 0.51 | 5.12 | 69.39 | 74.00 |
| 25 | 1 | 35.0 | 64.80 | 90 | 0.54 | 5.37 | 70.17 | 75.00 |
| 26 | 1 | 36.0 | 65.36 | 90 | 0.56 | 5.60 | 70.96 | 76.00 |
| 27 | 1 | 37.0 | 65.94 | 90 | 0.58 | 5.82 | 71.76 | 77.00 |
| 28 | 1 | 38.0 | 66.55 | 90 | 0.60 | 6.03 | 72.57 | 78.00 |
| 29 | 1 | 39.0 | 67.17 | 90 | 0.62 | 6.23 | 73.40 | 79.00 |
| 30 | 1 | 40.0 | 67.81 | 90 | 0.64 | 6.42 | 74.23 | 80.00 |
| 31 | 1 | 41.0 | 68.47 | 90 | 0.66 | 6.59 | 75.07 | 81.00 |
| 32 | 1 | 42.0 | 69.15 | 90 | 0.68 | 6.76 | 75.91 | 82.00 |
| 33 | 1 | 43.0 | 69.84 | 90 | 0.69 | 6.93 | 76.77 | 83.00 |
| 34 | 1 | 44.0 | 70.55 | 90 | 0.71 | 7.08 | 77.63 | 84.00 |
| 35 | 1 | 45.0 | 71.27 | 90 | 0.72 | 7.23 | 78.50 | 85.00 |
| 36 | 1 | 46.0 | 72.01 | 90 | 0.74 | 7.36 | 79.37 | 86.00 |
| 37 | 1 | 47.0 | 72.76 | 90 | 0.75 | 7.50 | 80.25 | 87.00 |
| 38 | 1 | 48.0 | 73.52 | 90 | 0.76 | 7.62 | 81.14 | 88.00 |
| 39 | 1 | 49.0 | 74.29 | 90 | 0.77 | 7.74 | 82.03 | 89.00 |
| 40 | 1 | 50.0 | 75.08 | 90 | 0.79 | 7.85 | 82.93 | 90.00 |
| 41 | 1 | 51.0 | 75.87 | 90 | 0.80 | 7.96 | 83.84 | 91.00 |
| 42 | 1 | 52.0 | 76.68 | 90 | 0.81 | 8.06 | 84.74 | 92.00 |
| 43 | 1 | 53.0 | 77.50 | 90 | 0.82 | 8.16 | 85.66 | 93.00 |
| 44 | 1 | 54.0 | 78.32 | 90 | 0.83 | 8.25 | 86.57 | 94.00 |
| 45 | 1 | 55.0 | 79.16 | 90 | 0.83 | 8.34 | 87.49 | 95.00 |
| 46 | 1 | 56.0 | 80.00 | 90 | 0.84 | 8.42 | 88.42 | 96.00 |
| 47 | 1 | 57.0 | 80.85 | 90 | 0.85 | 8.50 | 89.35 | 97.00 |
| 48 | 1 | 58.0 | 81.71 | 90 | 0.86 | 8.58 | 90.28 | 98.00 |
| 49 | 0 | 58.0 | 82.52 | 90 | 0.81 | 8.15 | 90.67 | 98.00 |
| 50 | 0 | 58.0 | 83.29 | 90 | 0.77 | 7.74 | 91.03 | 98.00 |
| 51 | 0 | 58.0 | 84.03 | 90 | 0.74 | 7.35 | 91.38 | 98.00 |
| 52 | 0 | 58.0 | 84.73 | 90 | 0.70 | 6.99 | 91.71 | 98.00 |
| 53 | 0 | 58.0 | 85.39 | 90 | 0.66 | 6.64 | 92.03 | 98.00 |
| 54 | 0 | 58.0 | 86.02 | 90 | 0.63 | 6.30 | 92.33 | 98.00 |
| 55 | 0 | 58.0 | 86.62 | 90 | 0.60 | 5.99 | 92.61 | 98.00 |
| 56 | 0 | 58.0 | 87.19 | 90 | 0.57 | 5.69 | 92.88 | 98.00 |
| 57 | 0 | 58.0 | 87.73 | 90 | 0.54 | 5.41 | 93.14 | 98.00 |
| 58 | 0 | 58.0 | 88.24 | 90 | 0.51 | 5.13 | 93.38 | 98.00 |
| 59 | 0 | 58.0 | 88.73 | 90 | 0.49 | 4.88 | 93.61 | 98.00 |
| 60 | 0 | 58.0 | 89.20 | 90 | 0.46 | 4.63 | 93.83 | 98.00 |
| 61 | 0 | 58.0 | 89.64 | 90 | 0.44 | 4.40 | 94.04 | 98.00 |
| 62 | 0 | 58.0 | 90.05 | 90 | 0.42 | 4.18 | 94.24 | 98.00 |
| 63 | −1 | 57.0 | 90.40 | 90 | 0.35 | 3.47 | 93.87 | 97.00 |
| 64 | −1 | 56.0 | 90.68 | 90 | 0.28 | 2.80 | 93.48 | 96.00 |
| 65 | −1 | 55.0 | 90.90 | 90 | 0.22 | 2.16 | 93.06 | 95.00 |
| 66 | −1 | 54.0 | 91.05 | 90 | 0.16 | 1.55 | 92.60 | 94.00 |
| 67 | −1 | 53.0 | 91.15 | 90 | 0.10 | 0.97 | 92.12 | 93.00 |
| 68 | −1 | 52.0 | 91.19 | 90 | 0.04 | 0.43 | 91.62 | 92.00 |
| 69 | −1 | 51.0 | 91.18 | 90 | −0.01 | −0.10 | 91.09 | 91.00 |
| 70 | −1 | 50.0 | 91.12 | 90 | −0.06 | −0.59 | 89.98 | 90.00 |
| 71 | 0 | 50.0 | 91.07 | 90 | −0.06 | −0.56 | 89.98 | 90.00 |
| 72 | 0 | 50.0 | 91.01 | 90 | −0.05 | −0.53 | 89.98 | 90.00 |
| 73 | 0 | 50.0 | 90.96 | 90 | −0.05 | −0.51 | 89.98 | 90.00 |
| 74 | 0 | 50.0 | 90.91 | 90 | −0.05 | −0.48 | 89.98 | 90.00 |
| 75 | 0 | 50.0 | 90.87 | 90 | −0.05 | −0.46 | 89.98 | 90.00 |
| 76 | 0 | 50.0 | 90.83 | 90 | −0.04 | −0.43 | 89.98 | 90.00 |
| 77 | 0 | 50.0 | 90.78 | 90 | −0.04 | −0.41 | 89.98 | 90.00 |
| 78 | 0 | 50.0 | 90.75 | 90 | −0.04 | −0.39 | 89.98 | 90.00 |
| 79 | 0 | 50.0 | 90.71 | 90 | −0.04 | −0.37 | 89.98 | 90.00 |
| 80 | 0 | 50.0 | 90.67 | 90 | −0.04 | −0.35 | 89.98 | 90.00 |
| 81 | 0 | 50.0 | 90.64 | 90 | −0.03 | −0.34 | 89.98 | 90.00 |
| 82 | 0 | 50.0 | 90.61 | 90 | −0.03 | −0.32 | 89.98 | 90.00 |
| 83 | 0 | 50.0 | 90.58 | 90 | −0.03 | −0.30 | 89.98 | 90.00 |
| 84 | 0 | 50.0 | 90.55 | 90 | −0.03 | −0.29 | 89.98 | 90.00 |
| 85 | 0 | 50.0 | 90.52 | 90 | −0.03 | −0.27 | 89.98 | 90.00 |
| 86 | 0 | 50.0 | 90.49 | 90 | −0.03 | −0.26 | 89.98 | 90.00 |
| 87 | 0 | 50.0 | 90.47 | 90 | −0.02 | −0.25 | 89.98 | 90.00 |
| 88 | 0 | 50.0 | 90.45 | 90 | −0.02 | −0.23 | 89.98 | 90.00 |
| 89 | 0 | 50.0 | 90.42 | 90 | −0.02 | −0.22 | 89.98 | 90.00 |
| 90 | 0 | 50.0 | 90.40 | 90 | −0.02 | −0.21 | 89.98 | 90.00 |
| 91 | 0 | 50.0 | 90.38 | 90 | −0.02 | −0.20 | 89.98 | 90.00 |
| 92 | 0 | 50.0 | 90.36 | 90 | −0.02 | −0.19 | 89.98 | 90.00 |
| 93 | 0 | 50.0 | 90.35 | 90 | −0.02 | −0.18 | 89.98 | 90.00 |
| 94 | 0 | 50.0 | 90.33 | 90 | −0.02 | −0.17 | 89.98 | 90.00 |
| 95 | 0 | 50.0 | 90.31 | 90 | −0.02 | −0.16 | 89.98 | 90.00 |
| 96 | 0 | 50.0 | 90.30 | 90 | −0.02 | −0.16 | 89.98 | 90.00 |
| 97 | 0 | 50.0 | 90.28 | 90 | −0.01 | −0.15 | 89.98 | 90.00 |
| 98 | 0 | 50.0 | 90.27 | 90 | −0.01 | −0.14 | 89.98 | 90.00 |
| 99 | 0 | 50.0 | 90.25 | 90 | −0.01 | −0.13 | 89.98 | 90.00 |
| 100 | 0 | 50.0 | 90.24 | 90 | −0.01 | −0.13 | 89.98 | 90.00 |

Details of the simulation shown in FIG. 3e are listed in Table 5.

TABLE 5

| min | mov | DCV | ICV | Target | icvvel | veldist | velstop | final icv |
|---|---|---|---|---|---|---|---|---|
| 0 | 0 | 20.0 | 60.00 | 60 | 0.00 | 0.00 | 60.00 | 60.00 |
| 1 | 0 | 20.0 | 60.00 | 60 | 0.00 | 0.00 | 60.00 | 60.00 |
| 2 | 0 | 20.0 | 60.00 | 60 | 0.00 | 0.00 | 60.00 | 60.00 |
| 3 | 0 | 20.0 | 60.00 | 60 | 0.00 | 0.00 | 60.00 | 60.00 |
| 4 | 0 | 20.0 | 60.00 | 60 | 0.00 | 0.00 | 60.00 | 60.00 |
| 5 | 0 | 20.0 | 60.00 | 60 | 0.00 | 0.00 | 60.00 | 60.00 |
| 6 | 0 | 20.0 | 60.00 | 60 | 0.00 | 0.00 | 60.00 | 60.00 |
| 7 | 0 | 20.0 | 60.00 | 60 | 0.00 | 0.00 | 60.00 | 60.00 |
| 8 | 0 | 20.0 | 60.00 | 60 | 0.00 | 0.00 | 60.00 | 60.00 |
| 9 | 0 | 20.0 | 60.00 | 60 | 0.00 | 0.00 | 60.00 | 60.00 |
| 10 | 0 | 20.0 | 60.00 | 90 | 0.00 | 0.00 | 60.00 | 60.00 |
| 11 | 1 | 21.0 | 60.05 | 90 | 0.05 | 2.00 | 62.05 | 61.00 |
| 12 | 1 | 22.0 | 60.15 | 90 | 0.10 | 3.90 | 64.05 | 62.00 |
| 13 | 1 | 23.0 | 60.29 | 90 | 0.14 | 5.71 | 66.00 | 63.00 |
| 14 | 1 | 24.0 | 60.48 | 90 | 0.19 | 7.42 | 67.90 | 64.00 |
| 15 | 1 | 25.0 | 60.70 | 90 | 0.23 | 9.05 | 69.75 | 65.00 |
| 16 | 1 | 26.0 | 60.97 | 90 | 0.26 | 10.60 | 71.56 | 66.00 |
| 17 | 1 | 27.0 | 61.27 | 90 | 0.30 | 12.07 | 73.33 | 67.00 |
| 18 | 1 | 28.0 | 61.60 | 90 | 0.34 | 13.46 | 75.07 | 68.00 |
| 19 | 1 | 29.0 | 61.97 | 90 | 0.37 | 14.79 | 76.76 | 69.00 |
| 20 | 1 | 30.0 | 62.38 | 90 | 0.40 | 16.05 | 78.43 | 70.00 |
| 21 | 1 | 31.0 | 62.81 | 90 | 0.43 | 17.25 | 80.06 | 71.00 |
| 22 | 1 | 32.0 | 63.27 | 90 | 0.46 | 18.39 | 81.65 | 72.00 |
| 23 | 1 | 33.0 | 63.75 | 90 | 0.49 | 19.47 | 83.22 | 73.00 |
| 24 | 1 | 34.0 | 64.27 | 90 | 0.51 | 20.49 | 84.76 | 74.00 |
| 25 | 1 | 35.0 | 64.80 | 90 | 0.54 | 21.47 | 86.27 | 75.00 |
| 26 | 1 | 36.0 | 65.36 | 90 | 0.56 | 22.39 | 87.76 | 76.00 |
| 27 | 1 | 37.0 | 65.94 | 90 | 0.58 | 23.28 | 89.22 | 77.00 |
| 28 | 1 | 38.0 | 66.55 | 90 | 0.60 | 24.11 | 90.66 | 78.00 |
| 29 | 0 | 38.0 | 67.12 | 90 | 0.57 | 22.91 | 90.03 | 78.00 |
| 30 | 0 | 38.0 | 67.66 | 90 | 0.54 | 21.76 | 89.42 | 78.00 |
| 31 | 1 | 39.0 | 68.23 | 90 | 0.57 | 22.67 | 90.90 | 79.00 |
| 32 | 0 | 39.0 | 68.77 | 90 | 0.54 | 21.54 | 90.31 | 79.00 |
| 33 | 0 | 39.0 | 69.28 | 90 | 0.51 | 20.46 | 89.74 | 79.00 |
| 34 | 1 | 40.0 | 69.82 | 90 | 0.54 | 21.44 | 91.26 | 80.00 |
| 35 | 0 | 40.0 | 70.33 | 90 | 0.51 | 20.37 | 90.69 | 80.00 |
| 36 | 0 | 40.0 | 70.81 | 90 | 0.48 | 19.35 | 90.16 | 80.00 |
| 37 | 0 | 40.0 | 71.27 | 90 | 0.46 | 18.38 | 89.65 | 80.00 |
| 38 | 1 | 41.0 | 71.76 | 90 | 0.49 | 19.46 | 91.22 | 81.00 |
| 39 | 0 | 41.0 | 72.22 | 90 | 0.46 | 18.49 | 90.71 | 81.00 |
| 40 | 0 | 41.0 | 72.66 | 90 | 0.44 | 17.56 | 90.22 | 81.00 |
| 41 | 0 | 41.0 | 73.07 | 90 | 0.42 | 16.69 | 89.76 | 81.00 |
| 42 | 1 | 42.0 | 73.52 | 90 | 0.45 | 17.85 | 91.37 | 82.00 |
| 43 | 0 | 42.0 | 73.94 | 90 | 0.42 | 16.96 | 90.90 | 82.00 |
| 44 | 0 | 42.0 | 74.35 | 90 | 0.40 | 16.11 | 90.46 | 82.00 |
| 45 | 0 | 42.0 | 74.73 | 90 | 0.38 | 15.31 | 90.04 | 82.00 |
| 46 | 0 | 42.0 | 75.09 | 90 | 0.36 | 14.54 | 89.63 | 82.00 |
| 47 | 1 | 43.0 | 75.49 | 90 | 0.40 | 15.81 | 91.30 | 83.00 |
| 48 | 0 | 43.0 | 75.86 | 90 | 0.38 | 15.02 | 90.89 | 83.00 |
| 49 | 0 | 43.0 | 76.22 | 90 | 0.36 | 14.27 | 90.49 | 83.00 |
| 50 | 0 | 43.0 | 76.56 | 90 | 0.34 | 13.56 | 90.12 | 83.00 |
| 51 | 0 | 43.0 | 76.88 | 90 | 0.32 | 12.88 | 89.76 | 83.00 |
| 52 | 1 | 44.0 | 77.24 | 90 | 0.36 | 14.24 | 91.47 | 84.00 |
| 53 | 0 | 44.0 | 77.58 | 90 | 0.34 | 13.52 | 91.10 | 84.00 |
| 54 | 0 | 44.0 | 77.90 | 90 | 0.32 | 12.85 | 90.75 | 84.00 |
| 55 | 0 | 44.0 | 78.20 | 90 | 0.31 | 12.21 | 90.41 | 84.00 |
| 56 | 0 | 44.0 | 78.49 | 90 | 0.29 | 11.60 | 90.09 | 84.00 |
| 57 | 0 | 44.0 | 78.77 | 90 | 0.28 | 11.02 | 89.78 | 84.00 |
| 58 | 1 | 45.0 | 79.08 | 90 | 0.31 | 12.46 | 91.54 | 85.00 |
| 59 | 0 | 45.0 | 79.38 | 90 | 0.30 | 11.84 | 91.22 | 85.00 |
| 60 | 0 | 45.0 | 79.66 | 90 | 0.28 | 11.25 | 90.91 | 85.00 |
| 61 | 0 | 45.0 | 79.92 | 90 | 0.27 | 10.69 | 90.61 | 85.00 |
| 62 | 0 | 45.0 | 80.18 | 90 | 0.25 | 10.15 | 90.33 | 85.00 |
| 63 | 0 | 45.0 | 80.42 | 90 | 0.24 | 9.65 | 90.06 | 85.00 |

TABLE 5-continued

| min | mov | DCV | ICV | Target | icvvel | veldist | velstop | final icv |
|---|---|---|---|---|---|---|---|---|
| 64 | 0 | 45.0 | 80.65 | 90 | 0.23 | 9.16 | 89.81 | 85.00 |
| 65 | 1 | 46.0 | 80.92 | 90 | 0.27 | 10.70 | 91.62 | 86.00 |
| 66 | 0 | 46.0 | 81.17 | 90 | 0.25 | 10.17 | 91.34 | 86.00 |
| 67 | 0 | 46.0 | 81.41 | 90 | 0.24 | 9.66 | 91.07 | 86.00 |
| 68 | 0 | 46.0 | 81.64 | 90 | 0.23 | 9.18 | 90.82 | 86.00 |
| 69 | 0 | 46.0 | 81.86 | 90 | 0.22 | 8.72 | 90.58 | 86.00 |
| 70 | 0 | 46.0 | 82.07 | 90 | 0.21 | 8.28 | 90.35 | 86.00 |
| 71 | 0 | 46.0 | 82.26 | 90 | 0.20 | 7.87 | 90.13 | 86.00 |
| 72 | 0 | 46.0 | 82.45 | 90 | 0.19 | 7.48 | 89.92 | 86.00 |
| 73 | 1 | 47.0 | 82.68 | 90 | 0.23 | 9.10 | 91.78 | 87.00 |
| 74 | 0 | 47.0 | 82.89 | 90 | 0.22 | 8.65 | 91.54 | 87.00 |
| 75 | 0 | 47.0 | 83.10 | 90 | 0.21 | 8.21 | 91.31 | 87.00 |
| 76 | 0 | 47.0 | 83.29 | 90 | 0.20 | 7.80 | 91.10 | 87.00 |
| 77 | 0 | 47.0 | 83.48 | 90 | 0.19 | 7.41 | 90.89 | 87.00 |
| 78 | 0 | 47.0 | 83.65 | 90 | 0.18 | 7.04 | 90.70 | 87.00 |
| 79 | 0 | 47.0 | 83.82 | 90 | 0.17 | 6.69 | 90.51 | 87.00 |
| 80 | 0 | 47.0 | 83.98 | 90 | 0.16 | 6.36 | 90.34 | 87.00 |
| 81 | 0 | 47.0 | 84.13 | 90 | 0.15 | 6.04 | 90.17 | 87.00 |
| 82 | 0 | 47.0 | 84.28 | 90 | 0.14 | 5.74 | 90.01 | 87.00 |
| 83 | 0 | 47.0 | 84.41 | 90 | 0.14 | 5.45 | 89.86 | 87.00 |
| 84 | 1 | 48.0 | 84.59 | 90 | 0.18 | 7.18 | 91.77 | 88.00 |
| 85 | 0 | 48.0 | 84.76 | 90 | 0.17 | 6.82 | 91.58 | 88.00 |
| 86 | 0 | 48.0 | 84.92 | 90 | 0.16 | 6.48 | 91.40 | 88.00 |
| 87 | 0 | 48.0 | 85.08 | 90 | 0.15 | 6.15 | 91.23 | 88.00 |
| 88 | 0 | 48.0 | 85.22 | 90 | 0.15 | 5.85 | 91.07 | 88.00 |
| 89 | 0 | 48.0 | 85.36 | 90 | 0.14 | 5.55 | 90.92 | 88.00 |
| 90 | 0 | 48.0 | 85.49 | 90 | 0.13 | 5.28 | 90.77 | 88.00 |
| 91 | 0 | 48.0 | 85.62 | 90 | 0.13 | 5.01 | 90.63 | 88.00 |
| 92 | 0 | 48.0 | 85.74 | 90 | 0.12 | 4.76 | 90.50 | 88.00 |
| 93 | 0 | 48.0 | 85.85 | 90 | 0.11 | 4.52 | 90.37 | 88.00 |
| 94 | 0 | 48.0 | 85.96 | 90 | 0.11 | 4.30 | 90.26 | 88.00 |
| 95 | 0 | 48.0 | 86.06 | 90 | 0.10 | 4.08 | 90.14 | 88.00 |
| 96 | 0 | 48.0 | 86.16 | 90 | 0.10 | 3.88 | 90.04 | 88.00 |
| 97 | 0 | 48.0 | 86.25 | 90 | 0.09 | 3.68 | 89.93 | 88.00 |
| 98 | 1 | 49.0 | 86.39 | 90 | 0.14 | 5.50 | 91.89 | 89.00 |
| 99 | 0 | 49.0 | 86.52 | 90 | 0.13 | 5.23 | 91.74 | 89.00 |
| 100 | 0 | 49.0 | 86.64 | 90 | 0.12 | 4.96 | 91.61 | 89.00 |

Figure 3F:
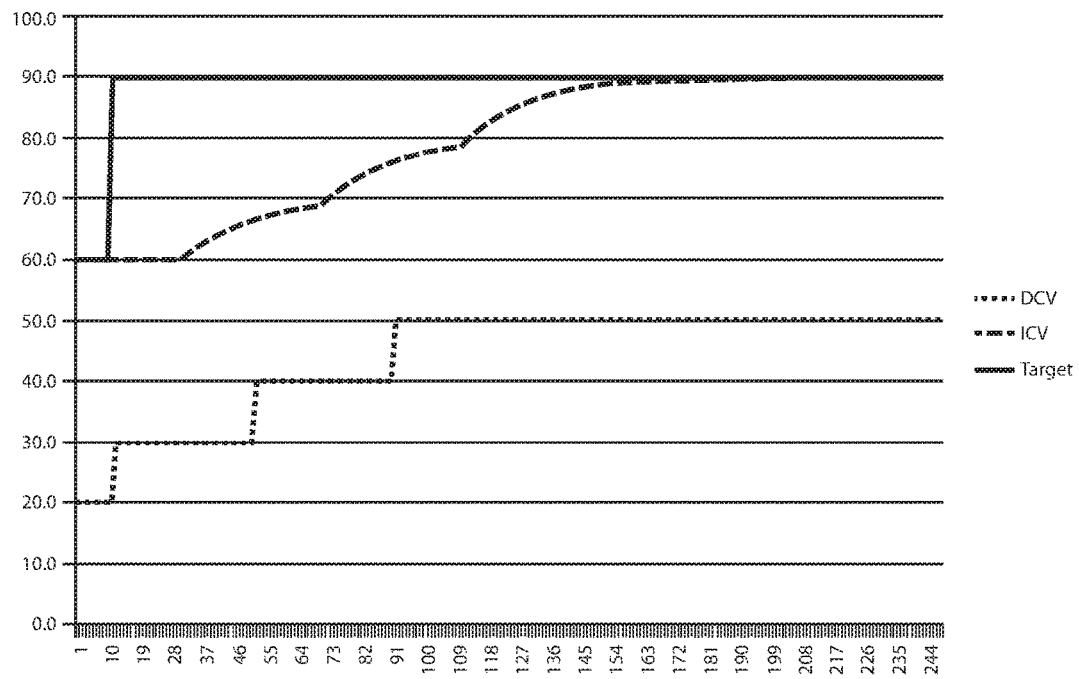

Those skilled in the art will recognize that processes with significant dead time pose a potential problem for this method. This is addressed by introducing the move period for ICVs that have significant dead time, such that DCV values are only updated once per period. This allows for the effects of the previous move to become evident before making additional moves. The period is set approximately equal to (or greater than) the overall response time, i.e. dead time plus response time, and move size is increased to compensate for less frequent moves. FIG. 3f shows the original simulation as with FIG. 3a, but with a 20 minute dead time, having a period of 40 minutes (dead time plus response time), and a move size of 10. When the target increases from 60% to 90% at time=10, the controller commences a DCV move series of +10/period. The graph shows the target increase, the increasing DCV, and the delayed ICV response. After a series of three step changes the ICV ultimately settles at the target value approximately three period (dead time plus response time) times later (time=10+(3×40)=ca. 130 minutes). Details of the simulation shown in FIG. 3f are listed in Table 6.

TABLE 6

| min | mov | DCV | ICV | Target | icvvel | veldist | velstop | final icv |
|---|---|---|---|---|---|---|---|---|
| 0 | 0 | 20.0 | 60.00 | 60 | 0.00 | 0.00 | 60.00 | 60.00 |
| 1 | 0 | 20.0 | 60.00 | 60 | 0.00 | 0.00 | 60.00 | 60.00 |
| 2 | 0 | 20.0 | 60.00 | 60 | 0.00 | 0.00 | 60.00 | 60.00 |
| 3 | 0 | 20.0 | 60.00 | 60 | 0.00 | 0.00 | 60.00 | 60.00 |
| 4 | 0 | 20.0 | 60.00 | 60 | 0.00 | 0.00 | 60.00 | 60.00 |
| 5 | 0 | 20.0 | 60.00 | 60 | 0.00 | 0.00 | 60.00 | 60.00 |
| 6 | 0 | 20.0 | 60.00 | 60 | 0.00 | 0.00 | 60.00 | 60.00 |
| 7 | 0 | 20.0 | 60.00 | 60 | 0.00 | 0.00 | 60.00 | 60.00 |
| 8 | 0 | 20.0 | 60.00 | 60 | 0.00 | 0.00 | 60.00 | 60.00 |
| 9 | 0 | 20.0 | 60.00 | 60 | 0.00 | 0.00 | 60.00 | 60.00 |
| 10 | 0 | 20.0 | 60.00 | 90 | 0.00 | 0.00 | 60.00 | 60.00 |
| 11 | 10 | 30.0 | 60.00 | 90 | 0.00 | 0.00 | 60.00 | 70.00 |
| 12 | 0 | 30.0 | 60.00 | 90 | 0.00 | 0.00 | 60.00 | 70.00 |
| 13 | 0 | 30.0 | 60.00 | 90 | 0.00 | 0.00 | 60.00 | 70.00 |
| 14 | 0 | 30.0 | 60.00 | 90 | 0.00 | 0.00 | 60.00 | 70.00 |
| 15 | 0 | 30.0 | 60.00 | 90 | 0.00 | 0.00 | 60.00 | 70.00 |
| 16 | 0 | 30.0 | 60.00 | 90 | 0.00 | 0.00 | 60.00 | 70.00 |
| 17 | 0 | 30.0 | 60.00 | 90 | 0.00 | 0.00 | 60.00 | 70.00 |
| 18 | 0 | 30.0 | 60.00 | 90 | 0.00 | 0.00 | 60.00 | 70.00 |
| 19 | 0 | 30.0 | 60.00 | 90 | 0.00 | 0.00 | 60.00 | 70.00 |
| 20 | 0 | 30.0 | 60.00 | 90 | 0.00 | 0.00 | 60.00 | 70.00 |
| 21 | 0 | 30.0 | 60.00 | 90 | 0.00 | 0.00 | 60.00 | 70.00 |
| 22 | 0 | 30.0 | 60.00 | 90 | 0.00 | 0.00 | 60.00 | 70.00 |
| 23 | 0 | 30.0 | 60.00 | 90 | 0.00 | 0.00 | 60.00 | 70.00 |
| 24 | 0 | 30.0 | 60.00 | 90 | 0.00 | 0.00 | 60.00 | 70.00 |
| 25 | 0 | 30.0 | 60.00 | 90 | 0.00 | 0.00 | 60.00 | 70.00 |
| 26 | 0 | 30.0 | 60.00 | 90 | 0.00 | 0.00 | 60.00 | 70.00 |
| 27 | 0 | 30.0 | 60.00 | 90 | 0.00 | 0.00 | 60.00 | 70.00 |
| 28 | 0 | 30.0 | 60.00 | 90 | 0.00 | 0.00 | 60.00 | 70.00 |
| 29 | 0 | 30.0 | 60.00 | 90 | 0.00 | 0.00 | 60.00 | 70.00 |
| 30 | 0 | 30.0 | 60.00 | 90 | 0.00 | 0.00 | 60.00 | 70.00 |
| 31 | 0 | 30.0 | 60.50 | 90 | 0.50 | 20.00 | 80.50 | 70.00 |
| 32 | 0 | 30.0 | 60.98 | 90 | 0.48 | 19.00 | 79.98 | 70.00 |
| 33 | 0 | 30.0 | 61.43 | 90 | 0.45 | 18.05 | 79.48 | 70.00 |
| 34 | 0 | 30.0 | 61.85 | 90 | 0.43 | 17.15 | 79.00 | 70.00 |
| 35 | 0 | 30.0 | 62.26 | 90 | 0.41 | 16.29 | 78.55 | 70.00 |
| 36 | 0 | 30.0 | 62.65 | 90 | 0.39 | 15.48 | 78.12 | 70.00 |
| 37 | 0 | 30.0 | 63.02 | 90 | 0.37 | 14.70 | 77.72 | 70.00 |
| 38 | 0 | 30.0 | 63.37 | 90 | 0.35 | 13.97 | 77.33 | 70.00 |
| 39 | 0 | 30.0 | 63.70 | 90 | 0.33 | 13.27 | 76.97 | 70.00 |
| 40 | 0 | 30.0 | 64.01 | 90 | 0.32 | 12.60 | 76.62 | 70.00 |
| 41 | 0 | 30.0 | 64.31 | 90 | 0.30 | 11.97 | 76.29 | 70.00 |
| 42 | 0 | 30.0 | 64.60 | 90 | 0.28 | 11.38 | 75.97 | 70.00 |
| 43 | 0 | 30.0 | 64.87 | 90 | 0.27 | 10.81 | 75.67 | 70.00 |
| 44 | 0 | 30.0 | 65.12 | 90 | 0.26 | 10.27 | 75.39 | 70.00 |
| 45 | 0 | 30.0 | 65.37 | 90 | 0.24 | 9.75 | 75.12 | 70.00 |
| 46 | 0 | 30.0 | 65.60 | 90 | 0.23 | 9.27 | 74.86 | 70.00 |
| 47 | 0 | 30.0 | 65.82 | 90 | 0.22 | 8.80 | 74.62 | 70.00 |
| 48 | 0 | 30.0 | 66.03 | 90 | 0.21 | 8.36 | 74.39 | 70.00 |
| 49 | 0 | 30.0 | 66.23 | 90 | 0.20 | 7.94 | 74.17 | 70.00 |
| 50 | 0 | 30.0 | 66.42 | 90 | 0.19 | 7.55 | 73.96 | 70.00 |
| 51 | 10 | 40.0 | 66.59 | 90 | 0.18 | 7.17 | 73.76 | 80.00 |
| 52 | 0 | 40.0 | 66.76 | 90 | 0.17 | 6.81 | 73.58 | 80.00 |
| 53 | 0 | 40.0 | 66.93 | 90 | 0.16 | 6.47 | 73.40 | 80.00 |
| 54 | 0 | 40.0 | 67.08 | 90 | 0.15 | 6.15 | 73.23 | 80.00 |
| 55 | 0 | 40.0 | 67.23 | 90 | 0.15 | 5.84 | 73.07 | 80.00 |
| 56 | 0 | 40.0 | 67.36 | 90 | 0.14 | 5.55 | 72.91 | 80.00 |
| 57 | 0 | 40.0 | 67.50 | 90 | 0.13 | 5.27 | 72.77 | 80.00 |
| 58 | 0 | 40.0 | 67.62 | 90 | 0.13 | 5.01 | 72.63 | 80.00 |
| 59 | 0 | 40.0 | 67.74 | 90 | 0.12 | 4.76 | 72.50 | 80.00 |
| 60 | 0 | 40.0 | 67.85 | 90 | 0.11 | 4.52 | 72.37 | 80.00 |
| 61 | 0 | 40.0 | 67.96 | 90 | 0.11 | 4.29 | 72.25 | 80.00 |
| 62 | 0 | 40.0 | 68.06 | 90 | 0.10 | 4.08 | 72.14 | 80.00 |
| 63 | 0 | 40.0 | 68.16 | 90 | 0.10 | 3.87 | 72.03 | 80.00 |
| 64 | 0 | 40.0 | 68.25 | 90 | 0.09 | 3.68 | 71.93 | 80.00 |
| 65 | 0 | 40.0 | 68.34 | 90 | 0.09 | 3.50 | 71.84 | 80.00 |
| 66 | 0 | 40.0 | 68.42 | 90 | 0.08 | 3.32 | 71.74 | 80.00 |
| 67 | 0 | 40.0 | 68.50 | 90 | 0.08 | 3.16 | 71.66 | 80.00 |
| 68 | 0 | 40.0 | 68.58 | 90 | 0.07 | 3.00 | 71.57 | 80.00 |
| 69 | 0 | 40.0 | 68.65 | 90 | 0.07 | 2.85 | 71.50 | 80.00 |
| 70 | 0 | 40.0 | 68.71 | 90 | 0.07 | 2.71 | 71.42 | 80.00 |
| 71 | 0 | 40.0 | 69.28 | 90 | 0.56 | 22.57 | 91.85 | 80.00 |
| 72 | 0 | 40.0 | 69.82 | 90 | 0.54 | 21.44 | 91.26 | 80.00 |
| 73 | 0 | 40.0 | 70.32 | 90 | 0.51 | 20.37 | 90.69 | 80.00 |
| 74 | 0 | 40.0 | 70.81 | 90 | 0.48 | 19.35 | 90.16 | 80.00 |
| 75 | 0 | 40.0 | 71.27 | 90 | 0.46 | 18.38 | 89.65 | 80.00 |
| 76 | 0 | 40.0 | 71.70 | 90 | 0.44 | 17.46 | 89.17 | 80.00 |
| 77 | 0 | 40.0 | 72.12 | 90 | 0.41 | 16.59 | 88.71 | 80.00 |
| 78 | 0 | 40.0 | 72.51 | 90 | 0.39 | 15.76 | 88.27 | 80.00 |
| 79 | 0 | 40.0 | 72.89 | 90 | 0.37 | 14.97 | 87.86 | 80.00 |
| 80 | 0 | 40.0 | 73.24 | 90 | 0.36 | 14.22 | 87.47 | 80.00 |
| 81 | 0 | 40.0 | 73.58 | 90 | 0.34 | 13.51 | 87.09 | 80.00 |

TABLE 6-continued

| min | mov | DCV | ICV | Target | icvvel | veldist | velstop | final icv |
|---|---|---|---|---|---|---|---|---|
| 82 | 0 | 40.0 | 73.90 | 90 | 0.32 | 12.84 | 86.74 | 80.00 |
| 83 | 0 | 40.0 | 74.21 | 90 | 0.30 | 12.20 | 86.40 | 80.00 |
| 84 | 0 | 40.0 | 74.50 | 90 | 0.29 | 11.59 | 86.08 | 80.00 |
| 85 | 0 | 40.0 | 74.77 | 90 | 0.28 | 11.01 | 85.78 | 80.00 |
| 86 | 0 | 40.0 | 75.03 | 90 | 0.26 | 10.46 | 85.49 | 80.00 |
| 87 | 0 | 40.0 | 75.28 | 90 | 0.25 | 9.93 | 85.22 | 80.00 |
| 88 | 0 | 40.0 | 75.52 | 90 | 0.24 | 9.44 | 84.95 | 80.00 |
| 89 | 0 | 40.0 | 75.74 | 90 | 0.22 | 8.97 | 84.71 | 80.00 |
| 90 | 0 | 40.0 | 75.95 | 90 | 0.21 | 8.52 | 84.47 | 80.00 |
| 91 | 10 | 50.0 | 76.16 | 90 | 0.20 | 8.09 | 84.25 | 90.00 |
| 92 | 0 | 50.0 | 76.35 | 90 | 0.19 | 7.69 | 84.04 | 90.00 |
| 93 | 0 | 50.0 | 76.53 | 90 | 0.18 | 7.30 | 83.83 | 90.00 |
| 94 | 0 | 50.0 | 76.70 | 90 | 0.17 | 6.94 | 83.64 | 90.00 |
| 95 | 0 | 50.0 | 76.87 | 90 | 0.16 | 6.59 | 83.46 | 90.00 |
| 96 | 0 | 50.0 | 77.03 | 90 | 0.16 | 6.26 | 83.29 | 90.00 |
| 97 | 0 | 50.0 | 77.17 | 90 | 0.15 | 5.95 | 83.12 | 90.00 |
| 98 | 0 | 50.0 | 77.32 | 90 | 0.14 | 5.65 | 82.97 | 90.00 |
| 99 | 0 | 50.0 | 77.45 | 90 | 0.13 | 5.37 | 82.82 | 90.00 |
| 100 | 0 | 50.0 | 77.58 | 90 | 0.13 | 5.10 | 82.68 | 90.00 |

Those skilled in the art will further notice that significant control cycling about the target value may result, depending on the move size, and this may be especially true of variables with dead time, where move size is larger to compensate for the longer period. This is remedied with a smart control deadband, such that when the ICV error (distance from target) is below a certain level, then the move size is reduced proportionately, such that move size goes to zero as error goes to zero.

In the context of the present invention, "deadband" would normally imply an error value below which no move is made. This is a common process control concept to reduce or eliminate control cycling or overshoot, i.e. the effect of the move may exceed the size of the current error. A "smart deadband" in this invention means that, instead of this usual deadband concept, the move size is adjusted based on the ongoing error, so that as the error approaches zero, the move size goes to zero. This also is a method to reduce or eliminate overshoot or cycling. The equation for a smart move size is as follows:

smart movesize=MIN((ABS(error)*k*movesize), movesize)

Where: ABS(error)=absolute value of the error, which is the difference between the ICV target and actual value; k=scaling constant, chosen so that the smart move size equals the normal move size under normal/expected error conditions; and movesize=normal move size.

The minimum function (MIN) assures that the smart move size never exceeds the normal move size. This "smart deadband/movesize" technique can also be used to effect a larger proportional move size under conditions of a relatively large error, i.e. where a larger control action is desired to reduce the large error, and the current error is large enough that cycling/overshoot is not yet a concern.

Those skilled in the art may point out that this approach is not as precise as model-based control and may result in excess transient error, i.e. excessive time for the ICV to be brought within limits or to its optimum value. However, the inventor believes that the gradual approach control of the present invention, and as reflected in FIGS. 3a through 3f, is usually preferred in real process operation, where maintaining process stability is always one of the most important priorities. Moreover, although model-based control can be perfect in theory and in simulations where the process response exactly matches the models (they are one and the same in most simulations), in practice it has been shown to have several shortcomings that lead to poor and unstable performance. The inventor has explained this in published trade journal articles and trade show presentations.

Figure 4:
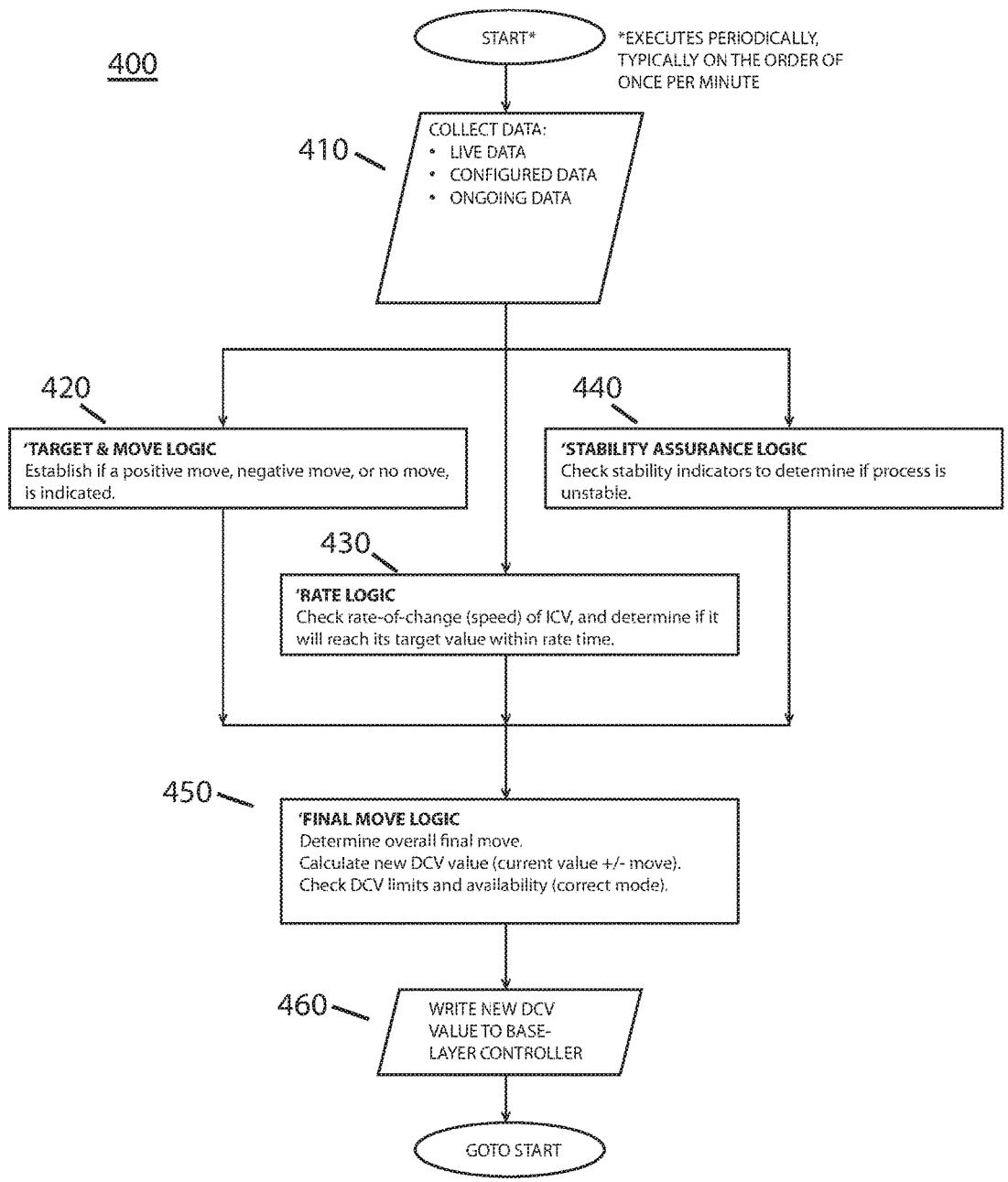
FIG. 4 is a block diagram of the present invention method of rate-based control with stability assurance, using an example of controlling one ICV with one DCV.

FIG. 4 diagrams the process flow of the RMC control algorithm 400. Multivariable control typically executes on the order of once per minute. On each execution, it communicates new DCV values to the base-layer controllers, which typically execute on the order of once per second. The overall sequence is summarized as follows: Collect current data 410; Move logic 420; Rate logic 430; Stability assurance logic 440; and Final move logic 450.

At the start of each execution, necessary data is collected 410 by the application. This includes updated live values of the direct control variable (DCV) and the indirect control variable (ICV), configured parameters, such as limits for each variable and the gain signs, and ongoing values that are preserved from execution to execution, such as the period counter and previous ICV value.

The move logic 420 ultimately establishes if the DCV needs a positive move, a negative move, or no move, based on the current value of the ICV, its limits, its optimum value, the sign (positive or negative) of the DCV/ICV response, and other factors. In the example, the target value changes from 60% to 90%. This could mean that the low limit was increased from 60% to 90%, or that its optimum value changed from 60% to 90%. In any case, its target value becomes greater than its current value, and because the DCV/ICV gain is positive, a positive DCV move is needed. The first priority of the move logic 420 is to keep the ICV within its limits, and the second priority is to move the ICV towards its optimum value, which is usually based on economics. The optimum value is often the high or low limit, but in some cases it can be an intermediate value. Note that DCVs also have limits, for example, if a positive move were needed, but the DCV were already at its high limit, then no move would be possible.

Rate logic 430 calculates the rate-of-change (or speed) of the ICV, and determines if, at the present speed, it will reach the target value within the rate-time. If so, then the rate logic 430 will ultimately override any move logic 420 and result in no move.

Stability assurance logic 440 monitors process stability and if instability is detected, then it will ultimately override any move logic 420 and result in no move. Simple reliable process stability indicators include rates of change of key variables and deviations (difference between setpoint and actual measurement) of single-loop controllers. For multivariable controllers, an example instability indicator would be a high rate of change (positive or negative) of the ICV, or a high deviation (positive or negative) of the DCV. Other suitable process stability indicators may be used, but this choice encapsulates the solution within the DCVs and ICVs that are already part of the controller.

Stability assurance is the concept that high-level control, such as multivariable control, should pause or switch off whenever process instability is detected. This is a further novel feature of the present invention as the overall purpose of many high level control applications in the past has been to enhance process stability and control, so the idea that they might cause instability and need to be safeguarded has never been addressed in industry. The history of MPC, especially as revealed by the inventor in his several trade journal articles, has shown the need for this safeguard, because MPC in the prior art has often been a source of process instability.

Moreover, stability assurance is also appropriate based on the process control principle that basic process stability is the responsibility of the base-layer controls, while high level controls provide optimization. Therefore, under conditions of instability, high level controls should pause or switch off regardless of the source of the instability, in order to allow the base-layer controls to better perform their role of re-establishing stability, and to avoid high level controls making potentially incorrect or further destabilizing moves as a result of the unstable condition of the process.

In the present invention, a Stability Detector can determine if it is safe and prudent to continue implementing the move series. If conditions are stable, then it is generally considered safe and prudent to proceed. If conditions are unstable, then the changes are paused until stable conditions are re-established, by action of the base-layer controls or by operator intervention, or by natural settling of the process. Stability can be detected in a number of ways. Non-limiting examples include: (a) any temperature reading that exceed a predetermined maximum temperature value; (b) any pressure reading that exceed a predetermined maximum pressure value; (c) a rate-of-change of a key process parameter, such as process pressures or flow rates, that exceed a predetermined value; (d) a high deviation (absolute difference between setpoint and actual value) on any controller.

The final move logic 450 determines and sends the new DCV value to the actual base layer control point 460 based on the combined results of the previous steps. For example, if move logic 420 indicated a positive move, rate logic 430 indicated the ICV would not reach its target within the rate-time, stability assurance logic 440 indicated the process was stable, and the base layer DCV was available and within limits, then the final move logic 450 would calculate and send a new value to the DCV 460. The new value would be the current value plus the move size. Final move logic 450 may also incorporate period logic, deadband logic, or other appropriate refinements.

EMBODIMENTS

This section describes how RMC can be extended to a multivariable control problem having multiple DCVs and ICVs. Basically, there are two cases to consider: 1) where a DCV affects multiple ICVs, such as all three DCV's in FIG. 1; and 2) where one ICV is affected by more than one DCV, such as ICV's 1, 3 and 5 in FIG. 1.

Example 1

Where a DCV affects multiple ICVs, then the move logic has to consider all of the ICVs under its control. If any ICV is outside of its limits, then a DCV move is needed. If any ICV is approaching its target value, then the moves are stopped. If all ICVs are within limits, then the DCV can be used to move itself or one of the ICVs (the one with the highest optimization priority) towards its optimum target value. If multiple ICVs are at or outside their limits and with gains such that the DCV can not improve one without worsening the other, then the DCV can be moved to control the ICV with the higher control priority, or the DCV can be configured to make no move when such a conflict occurs (this latter approach is typically preferred in operation, since it avoids potentially making matters worse).

Example 2

Where one ICV is affected by multiple DCVs, then the DCV with the greatest control priority for that ICV would be used, and the other DCVs would ignore that ICV. If the top priority DCV were unavailable or unable to control or optimize the ICV, then the next highest priority DCV would be used, and so forth. This embodiment describes a straightforward priority scheme to handle multivariable cases. In the inventor's experience, this is adequate, from an optimization, constraint control, and process operation standpoint, in most applications. It is possible that in some cases users may prefer to use an alternative hierarchy scheme or a more rigorous optimizer and pass resulting target values to the multivariable controller.

Figure 2:
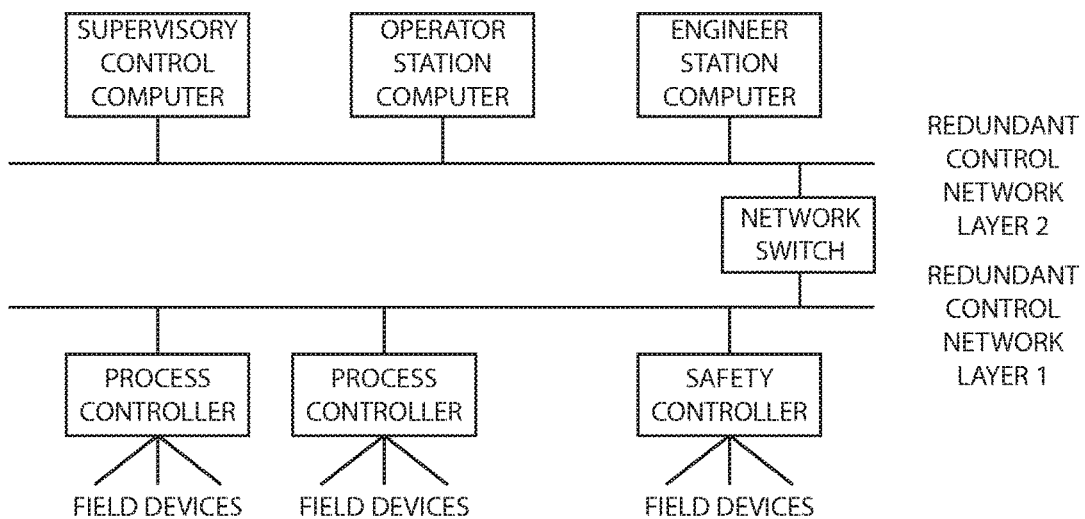
FIG. 2 is a schematic of a typical distributed control system (DCS) architecture in common use in the prior art.

The implementation of the present invention is typically done within the process control system. The vast majority of process control systems in the process industries today are distributed control systems (DCSs). An example DCS control system architecture is shown in FIG. 2. Basic process control functions occur at the controller level, which has very high reliability and speed, but relatively limited functionality. Higher level advanced control, as in the present invention, generally takes place at the supervisory computer level, which has greater functional capabilities, but relatively less reliability and speed. Operation, maintenance and engineering functions can take place from various workstations.

High level advanced control can also reside apart from the DCS but communicatively coupled to enable the communication of information, such as to a remote real time operating center that can monitor and control multiple processes. For example a remote centralized control center can enable the simultaneous monitor and control of multiple processes of an integrated refining and petrochemical complex.

The present invention can be implemented using function blocks, custom function blocks, or as a third-party application. Function blocks are built-in functions in the DCS such as math functions, signal processing functions, and control algorithm functions, that can be connected together graphically with software and configured in a "fill in the blanks" fashion to accomplish an overall control function. In modern DCSs, built-in function block capabilities are often extensive. Custom function blocks are re-usable like built-in function blocks, but can encapsulate custom functions programmed by the user that are not provided by built-in function blocks. This provides a degree of user-customized functionality, for applications such as the present invention, while preserving the benefits of the function block environment. A "third party application" refers to a software program written in a high level language that is hosted at the supervisory computer level, and which can be generic to the extent possible, i.e. it is written to work on any modern DCS by replacing only a minimum of DCS-specific communication interface software components.

In most high level process control applications, including the present invention, the complete installation design often includes a combination of standard function blocks and customization, in the form of either customized function blocks or third-party application software.

TERMINOLOGY

Advanced controls: These controls are typically added over time after the original commissioning of the process unit, to capture some economic or improved performance opportunity. Multivariable control is one example. Also known as supervisory or high-level controls, these often reside on a supervisory computer as in FIG. 2.

Base-layer (or Basic) controls: These controls provide the basic process operation and control requirements and typically are part of the original design, construction and commissioning of the process unit. Base-layer controls normally reside at the controller level in FIG. 2.

DCS: Distributed control system, the most common type of control system in use in the process industries. FIG. 2 illustrates a simplified DCS architecture.

DCV: direct control variable, typically a DCS controller setpoint or output, such as a flow or temperature controller. Similar to traditional MPC manipulated variable (MV), but note that in RMC there are no disturbance variables (DVs), hence the modified terminology.

ICV: indirect control variable, i.e. it is controlled indirectly via DCV(s), similar to MPC controlled variable (CV)

MPC: multivariable model-based predictive control as is known in the prior art.

The "rate-of-change" of an ICV is the rate (or "speed") at which the ICV is changing at any point in time. It is typically expressed in units per minute, such as PSIG (units of pressure) per minute, or degrees Fahrenheit (units of temperature) per minute. The controller calculates the ICV rate of change by using current and recent values and knowing the time interval between controller iterations. For example, a controller that executes every five seconds may calculate ICV rate-of-change as the current value, minus the previous value, times 12, to yield rate-of-change per minute. "The estimated time" is the duration, typically in minutes, required for the ICV to reach its target or constraint value, based on its current value and the current rate-of-change. For example, if a current ICV value is 100, its current rate-of-change is 10, and its target value is 110, then the estimated time to reach the target would be 1 minute.

The "logic-based directional move solver" means that the method of control uses a logic algorithm (as opposed to a mathematical algorithm) to determine only the direction to move each DCV. The logic algorithm does not determine how fast or ultimately how far to move each DCV, but only the direction (up or down, positive or negative, etc.). By comparison, model-based methods solve for direction, move size, and final value in one simultaneous mathematical solution.

"Pre-selected move rates" means that, after the direction for each DCV has been determined, the DCV is moved at a pre-selected rate (for example, at 10 units per minute). The actual rate is pre-selected and entered into the controller for each DCV, rather than being calculated within the controller as part of the control algorithm. The number is based on the user's knowledge and experience regarding safe process operation and desired operational performance. (Pre-selected move rates can be thought of as analogous to automobile speed limits, where the pre-selected move rate is not based on the distance to go or on minimizing travel time, but rather is based on road conditions and observing a safe rate of travel along the way.)

"Rate-based control" (RBC) is an especially novel method, explained in detail in the patent application, to discontinue the DCV moves (as previously determined by the directional move-solver and pre-selected move rates) predictively, based on the ongoing rate-of-change of related ICVs relative to their optimization targets and/or constraint limits. Those knowledgeable in process control will perceive, based on the idea of a directional move solver and pre-selected move rates, that some such complementary mechanism as RBC will be required to prevent undesirable overshoot and oscillatory control behavior from resulting. Said another way, RBC is a novel process control technique that makes using the relatively simple concepts of a directional move solver and pre-selected move rates possible.

An especially important characteristic of the RBC method is that the RBC method is inherently adaptive to, and therefore unaffected by, changes in process gain. This means that reliable control performance is unaffected by changes in process gain, which has been a particular and chronic vulnerability of essentially all other (model-based) control methods, which depend on the actual process gain being known (i.e. being represented in the controller by an accurate model). This feature is very important because actual process response often changes dynamically, so that basing controller parameters on a pre-determined "model" of the process response presents an inherent vulnerability.

Likewise, and also another important feature and claim of this patent application, RBC is inherently adaptive to, and therefore unaffected by, changes in the pre-selected move size. This is highly advantageous because it means that users can adjust move size to achieve desired process operational performance (to effectively speed up or slow down the control response) without affecting reliable and stable control performance.

Stability assurance is another particular aspect of this disclosure. It is a different concept than "process control stability" as normally considered in process control theory. Moreover, the concept and method of stability assurance in the present invention derive from the novel method of model-less control of the present invention itself and therefore are not (cannot be) a logical extension of past claims. The topic of process control stability in traditional process control theory analyzes control algorithms mathematically and offline to determine combinations (or "domains") of controller tuning values and actual process gains that become mathematically unstable (typically represented by an oscillatory response with increasing amplitude over time). This is a mathematical analysis used to investigate "windows of valid" (theoretically stable) tuning values for the process or type of process in question, but the control algorithms themselves do not actually monitor for process stability in any way, and therefore also do not change their control action in any way based on detecting instability, as in the present invention. Stability assurance, as defined for the current invention, is a potentially important feature that knowledgeable control engineers may notice. It is possible in the current invention that, if actual process gains are unexpectedly high, pre-selected moves are too large, and/or multiple DCVs (affecting the same ICV) are moved simultaneously, this could lead to an ICV moving faster than desired or expected. Or, it could lead to a DCV setpoint being moved faster than the base layer controller itself can keep up, leading to a high controller "deviation" (large unwanted difference between the controller variable and its setpoint). Due to this potential, it is basically a safeguard feature to include "stability assurance" in the present invention, and as uniquely defined for the present invention. Therefore, in the present invention, process instability is uniquely defined as high ICV rate of change or high DCV deviation from setpoint; the control algorithm itself monitors for process instability based on these criteria; and control action is modified (paused) should instability actually be detected. This contrasts with prior claims and industry concepts which deal only with mathematical offline analysis of the control algorithm; do not define criteria for process instability; the control algorithms do not actually monitor for process instability online (in "real-time"); and therefore they also do not take any modified control action based on instability.

System Description

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on by, the processing unit. By way of example, and not limitation, the computing unit includes an operating system, application programs, other program modules, and program data.

The components shown in the memory may also be included in other removable/non-removable, volatile/nonvolatile computer storage media. For example only, a hard disk drive may read from or write to non-removable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above therefore, store and/or carry computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like.

These and other input devices are often connected to the processing unit through the client interface that is coupled to a system bus, but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer or tablet device, a cellular telephone, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The terms "couple" or "couples," as used herein are intended to mean either an indirect or a direct connection. Thus, if a first device couples to a second device, that connection may be through a direct connection, or through an indirect electrical connection via other devices and connections. The term "communicatively coupled" as used herein is intended to mean coupling of components in a way to permit communication of information between the components. Two components may be communicatively coupled through a wired or wireless communication network, including but not limited to Ethernet, LAN, fiber optics, radio, microwaves, satellite, internet and the like. Operation and use of such communication networks is well known to those of ordinary skill in the art and will, therefore, not be discussed in detail herein.

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a workstation, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
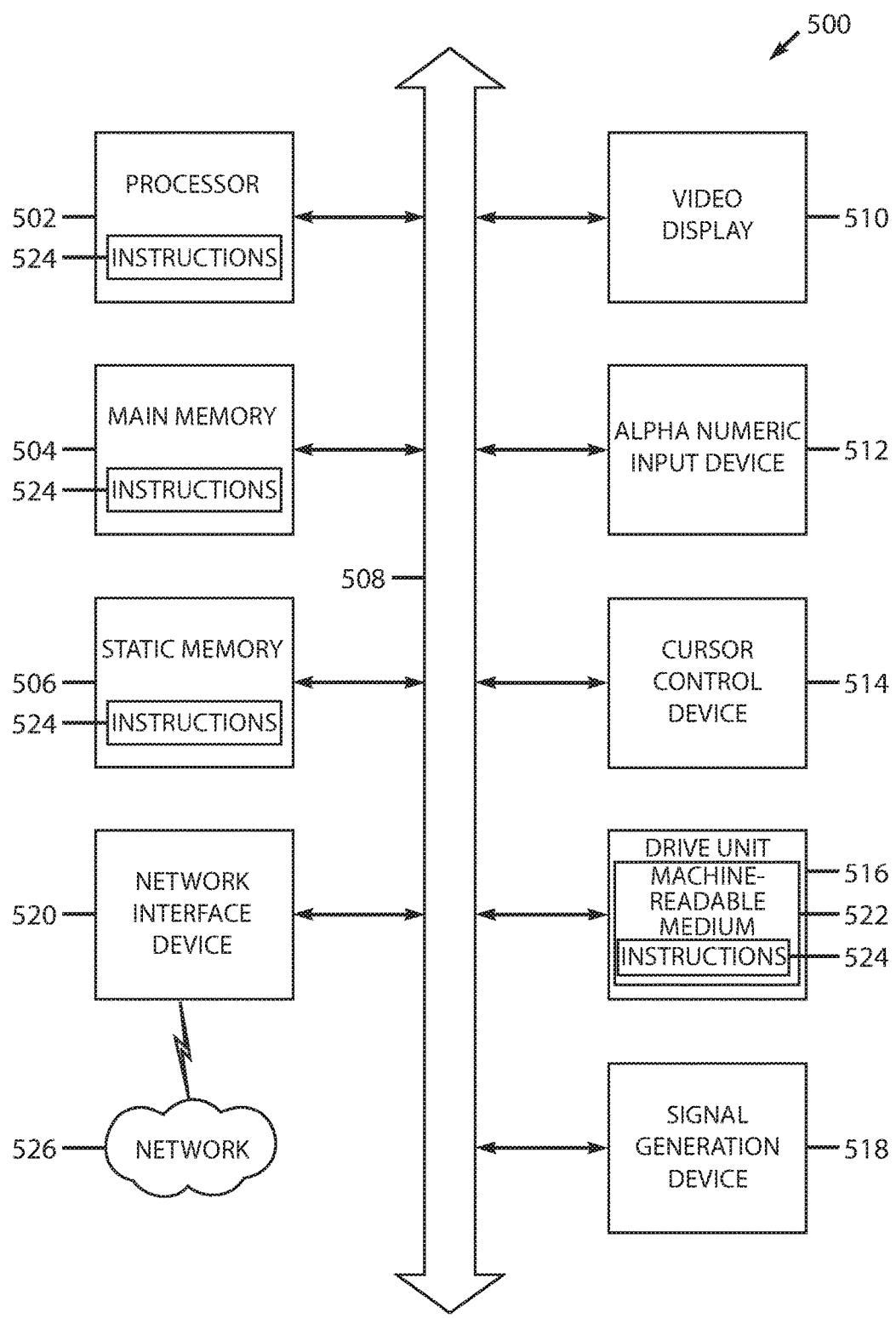
FIG. 5 is a diagrammatic representation of a machine in an example form of a computer system within which a set of instructions for causing the machine to perform any one or more of the methodologies discussed herein may be executed.

FIG. 5 is a block diagram of machine in the example form of a computer system 500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.
Machine-Readable Medium and Machine Readable Storage Medium The disk drive unit 516 includes a machine-readable medium 522 on which is stored one or more sets of instructions and data structures (e.g., software) 524 embodying or used by any one or more of the methodologies or functions described herein. The instructions 524 may also reside, completely or at least partially, within the main memory 504, static memory 506, and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing or encoding data structures used by or associated with such instructions. The term "machine-readable storage medium" shall accordingly be taken to include, but not be limited to, solid-state memories, and optical and magnetic media. Specific examples of machine-readable storage media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks. All such machine readable storage media are hardware devices suitable for storing data and/or instructions for a suitable period of time to enable use by the machine, and are therefore non-transitory.
Transmission Medium The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although many other internal components of the computer system are not shown, those of ordinary skill in the art will appreciate that such components and their interconnections are well known.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Process Description Process control systems, such as distributed or scalable process control systems like those used in hydrocarbon refining or petrochemical production processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Information from the field devices and the process controllers is typically made available to one or more other hardware devices such as operator workstations, maintenance workstations, engineer workstations, personal computers, handheld devices, data historians, report generators, centralized databases, etc., to enable an operator, maintenance or engineering person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

These and other diagnostic and optimization applications are typically implemented on a system-wide basis in one or more of the operator, maintenance or engineering workstations, and may provide preconfigured displays to the personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator, maintenance or engineering person to retune a control loop or to reset other control parameters, to run a test on one or more field devices to determine the current status of those field devices, to calibrate field devices or other equipment, or to perform other problem detection and correction activities on devices and equipment within the process plant.

While the invention has been described herein in terms of embodiments, these embodiments are not to be taken as limiting the scope of the invention. It is deemed to be within the scope of the present invention that each embodiment disclosed herein is usable with each and every other embodiment disclosed herein and that all embodiments disclosed herein are combinable with each other.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof and the scope thereof is determined by the claims that follow.

What is claimed is:

1. A method of process control of a unit operation within an industrial process comprising:
   collecting data sets for a multivariable process having an initial base layer Direct Control Variable value and multiple corresponding initial Indirect Control Variable values, a rate-time value and a move series value;
   receiving a target Indirect Control Variable value for each Indirect Control Variable;
   determining whether a change in Direct Control Variable value is needed;
   if needed, implementing a move series to the Direct Control Variable value;
   calculating a rate-of-change of each Indirect Control Variable value and an estimated time needed to reach the target indirect Control Variable value for each Indirect Control Variable;
   comparing the estimated times needed to reach each target Indirect Control Variable value with the rate-time;
   discontinuing the Direct Control Variable move series when the time needed to reach one of the Indirect Control Variable value is less than a predetermined percentage of the rate-time value;
   wherein the method does not utilize model-based control; and
   wherein the method controls one or more Direct Control Variable selected from the group consisting of: a flow controller, a temperature controller, a level controller, a pressure controller, and a stream property controller;
   wherein the one or more Direct Control Variable is an element of a unit operation within an industrial process, the industrial process selected from the group consisting of: mineral refining, oil refining, gas processing, natural gas liquids fractionation, chemical production, petrochemical production, fossil fueled power generation, nuclear power generation, food processing, and pharmaceutical production.

2. The method of claim 1, further comprising checking process stability.

3. The method of claim 2, wherein if an unstable condition within the process is detected the move series is temporarily halted until stability is achieved.

4. The method of claim 1, wherein the method does not utilize non-linear optimization.

5. The method of claim 1, wherein the method is not affected by changes in process gain.

6. The method of claim 1, wherein the method is not affected by changes in move size.

7. The method of claim 1, wherein the method is not affected by complex process interaction dynamics.

8. The method of claim 1, further comprising:
assigning a control priority to each Indirect Control Variable; and
discontinuing the Direct Control Variable move series when the time needed to reach the Indirect Control Variable value with highest control priority is less than a predetermined percentage of the rate-time value.

9. The method of claim 1, further comprising:
discontinuing the Direct Control Variable move series if the Direct Control Variable move series can not improve one Indirect Control Variable value without worsening a different Indirect Control Variable value.

10. A method of process control of a unit operation within an industrial process comprising:
collecting data sets for a multivariable process having multiple initial Direct Control Variable values and a corresponding initial Indirect Control Variable value, a rate-time value and a move series value;
receiving a target Indirect Control Variable value;
determining whether a change in a Direct Control Variable value is needed;
assigning a control priority to each Direct Control Variable;
if needed, implementing a move series to the Direct Control Variable value having the highest control priority;
calculating a rate-of-change of the Indirect Control Variable value and an estimated time needed to reach the target Indirect Control Variable value;
discontinuing the Direct Control Variable move series when the time needed to reach the Indirect Control Variable value is less than a predetermined percentage of the rate-time value;
wherein the method does not utilize model-based control; and
wherein the method controls one or more Direct Control Variable selected from the group consisting of: a flow controller, a temperature controller, a level controller, a pressure controller, and a stream property controller;
wherein the one or more Direct Control Variable is an element of a unit operation within an industrial process, the industrial process selected from the group consisting of: mineral refining, oil refining, gas processing, natural gas liquids fractionation, chemical production, petrochemical production, fossil fueled power generation, nuclear power generation, food processing, and pharmaceutical production.

11. The method of claim 10, further comprising checking process stability.

12. The method of claim 11, wherein if an unstable condition within the process is detected the move series is temporarily halted until stability is achieved.

13. The method of claim 10, wherein the method does not utilize non-linear optimization.

14. The method of claim 10, wherein the method is not affected by changes in process gain.

15. The method of claim 10, wherein the method is not affected by changes in move size.

16. The method of claim 10, wherein the method is not affected by complex process interaction dynamics.

17. The method of claim 10, further comprising:
if the Direct Control Variable having the move series is unable to control the Indirect Control Variable then the move series of that Direct Control Variable value will cease; and
if needed, implementing a move series to the Direct Control Variable value having the next highest control priority.

18. A non-transitory computer-readable medium storing instructions that, when executed by a processor, cause the processor to perform the method of claim 1 and control a unit operation within an industrial process.

19. A non-transitory computer-readable medium storing instructions that, when executed by a processor, cause the processor to perform the method of claim 10 and control a unit operation within an industrial process.

20. A system to control a unit operation within an industrial process comprising:
at least one processor;
at least one memory coupled to the at least one processor and storing computer executable instructions for a model-less multivariable process control, the computer executable instructions comprising instructions for the method of claim 1;
wherein the executable instructions control one or more Direct Control Variable selected from the group consisting of: a flow controller, a temperature controller a level controller, a pressure controller, and a stream property controller;
wherein the one or more Direct Control Variable is an element of a unit operation within an industrial process, the industrial process selected from the group consisting of: mineral refining, oil refining, as processing natural gas liquids fractionation, chemical production, petrochemical production, fossil fueled power generation, nuclear power generation, food processing, and pharmaceutical production.

21. A system to control a unit operation within an industrial process comprising:
at least one processor;
at least one memory coupled to the at least one processor and storing computer executable instructions for a model-less multivariable process control, the computer executable instructions comprising instructions for the method of claim 10;
wherein the executable instructions control one or more Direct Control Variable selected from the group consisting of: a flow controller, a temperature controller, a level controller, a pressure controller, and a stream property controller;
wherein the one or more Direct Control Variable is an element of a unit operation within an industrial process, the industrial process selected from the group consisting of: mineral refining, oil refining, gas processing, natural gas liquids fractionation, chemical production, petrochemical production, fossil fueled power generation, nuclear power generation, food processing, and pharmaceutical production.

* * * * *